(12) United States Patent
Tatsumura et al.

(10) Patent No.: US 12,105,769 B2
(45) Date of Patent: *Oct. 1, 2024

(54) OPTIMIZATION PROBLEM SOLVING CALCULATION APPARATUS

(71) Applicant: KABUSHIKI KAISHA TOSHIBA, Tokyo (JP)

(72) Inventors: Kosuke Tatsumura, Yokohama (JP); Hayato Goto, Kawasaki (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/335,274

(22) Filed: Jun. 15, 2023

(65) Prior Publication Data

US 2023/0325467 A1    Oct. 12, 2023

Related U.S. Application Data

(63) Continuation of application No. 17/363,872, filed on Jun. 30, 2021, now Pat. No. 11,720,645, which is a (Continued)

(30) Foreign Application Priority Data

Sep. 18, 2018  (JP) ................. 2018-174270

(51) Int. Cl.
*G06F 17/16* (2006.01)
*G06F 17/11* (2006.01)
*G06F 17/13* (2006.01)

(52) U.S. Cl.
CPC .............. *G06F 17/16* (2013.01); *G06F 17/11* (2013.01); *G06F 17/13* (2013.01)

(58) Field of Classification Search
CPC ..... G06F 17/11–13; G06F 17/16; G06F 7/544
See application file for complete search history.

(56) References Cited

U.S. PATENT DOCUMENTS 10,817,304 B2   10/2020   Tatsumura et al.
10,860,679 B2   12/2020   Goto et al.
(Continued)

FOREIGN PATENT DOCUMENTS

JP     2005-115497        4/2005
JP       5865456 B1       2/2016
(Continued)

OTHER PUBLICATIONS

Takahiro Inagaki, et al., "A coherent Ising machine for 2000-node optimization problems", Science, vol. 354, Issue 6312, (2016), 20 pages.

(Continued)

*Primary Examiner* — Matthew D Sandifer
(74) *Attorney, Agent, or Firm* — Oblon, McClelland, Maier & Neustadt, L.L.P.

(57) ABSTRACT

A calculation apparatus according to an embodiment includes matrix multiplication circuitry, time evolution circuitry, management circuitry, and output circuitry. The matrix multiplication circuitry calculates N second intermediate variables at a first time point by matrix multiplication between N (N>=2) first intermediate variables at the first time point and a preset coefficient matrix in N rows and N columns. The time evolution circuitry calculates N first variables at a second time point and N first intermediate variables at the second time point, the second time point being a time point following one sampling period after the first time point. The management circuitry increments time point from a start time point for each sampling period and controls the above circuitry to perform a process for each (Continued)

time point. The output circuitry outputs N first variables at a preset end time point.

31 Claims, 20 Drawing Sheets

Related U.S. Application Data continuation of application No. 16/289,084, filed on Feb. 28, 2019, now Pat. No. 11,093,581.

(56) References Cited

U.S. PATENT DOCUMENTS

| | | |
|---|---|---|
| 2009/0138245 A1 | 5/2009 | Appleyard |
| 2012/0022841 A1 | 1/2012 | Appleyard |
| 2015/0127310 A1 | 5/2015 | Grandison et al. |
| 2016/0065210 A1 | 3/2016 | Yoshimura et al. |
| 2018/0005114 A1 | 1/2018 | Tomita et al. |
| 2018/0018563 A1 | 1/2018 | Tsukamoto et al. |
| 2019/0266212 A1 | 8/2019 | Goto et al. |
| 2019/0278610 A1 | 9/2019 | Tatsumura et al. |

FOREIGN PATENT DOCUMENTS

| | | |
|---|---|---|
| JP | 2017-73106 | 4/2017 |
| JP | 2018-5541 | 1/2018 |
| JP | 2018-10474 | 1/2018 |
| JP | 2019-145010 A | 8/2019 |
| JP | 2019-159566 A | 9/2019 |
| JP | 2020-46887 | 3/2020 |
| WO | WO 2016/194221 A1 | 12/2016 |

OTHER PUBLICATIONS

Hayato Goto, "Bifurcation-based adiabatic quantum computation witha nonlinear oscillator network", Scientific Reports, 6, 21686 (2016), 9 pages.

Yoshitaka Haribara, et al., "Performance evaluation of coherent Ising machines against classical neural networks", Quantum Science and Technology, 2, 044002 (2017), 19 pages.

Office Action mailed Aug. 6, 2024 in Japanese Application No. 2023-121420 filed Jul. 26, 2023 (w/English Translation).

Saeki et al., "A Deterministic Ising Model Evolving in Binary-Quantized Heat Bath", IEICE Technical Report, the Institute of Electronics, Information and Communication Engineers, Jun. 16, 2005, 105th volume, No. 125, pp. 7-12 (w/ English Translation).

OPTIMIZATION PROBLEM SOLVING CALCULATION APPARATUS

CROSS-REFERENCE TO RELATED APPLICATIONS

This application is a continuation of and claims the benefit of priority under 35 U.S.C. § 120 from U.S. application Ser. No. 17/363,872 filed Jun. 30, 2021, which is a continuation of U.S. application Ser. No. 16/289,084 filed Feb. 28, 2019 (now U.S. Pat. No. 11,093,581 issued Aug. 17, 2021) and claims the benefit of priority under 35 U.S.C. § 119 from Japanese Patent Application No. 2018-174270 filed on Sep. 18, 2018, the entire contents of each of which are incorporated herein by reference.

FIELD

Embodiments described herein relate generally to a calculation apparatus.

BACKGROUND

Various algorithms for solving optimization problems using the Ising model have been proposed. Hardware for solving optimization problems using the Ising model also has been proposed.

It is preferable that such hardware for solving optimization problems can solve problems at high speed with a simple configuration. It is also preferable that such hardware for solving optimization problems can handle more variables. It is also preferable that such hardware for solving optimization problems can flexibly deal with change in number of variables to be treated without requiring a major design change.

DETAILED DESCRIPTION

Figure 1:
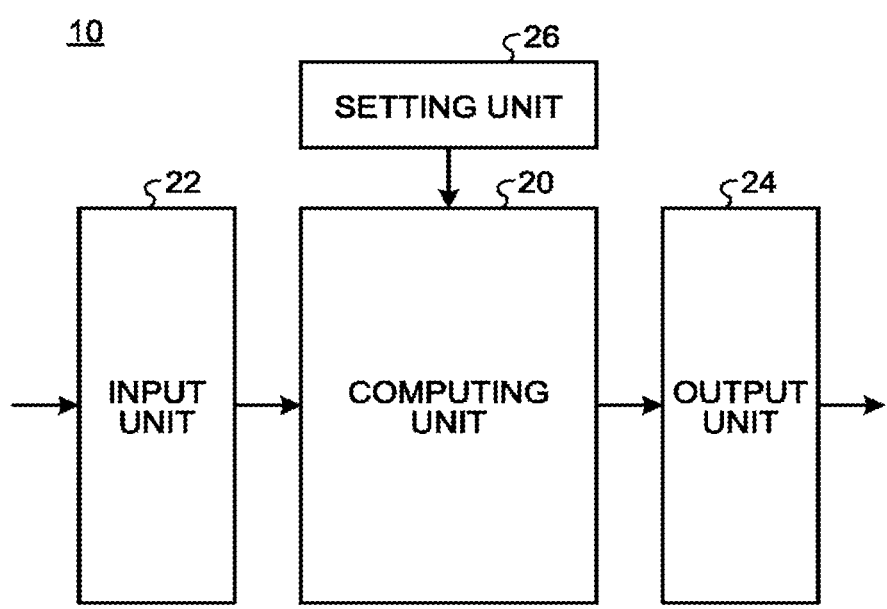
FIG. 1 is a configuration diagram of a calculation apparatus according to a first embodiment.

According to an embodiment, a calculation apparatus includes matrix multiplication circuitry, time evolution circuitry, management circuitry, and output circuitry. The matrix multiplication circuitry is configured to calculate N second intermediate variables at a first time point by performing matrix multiplication between N (N is an integer equal to or greater than two) first intermediate variables at the first time point and a coefficient matrix including preset coefficients in N rows and N columns. The time evolution circuitry is configured to calculate, based on the N second intermediate variables at the first time point, N first variables at a second time point and N first intermediate variables at the second time point, the second time point being a time point following one sampling period after the first time point. The management circuitry is configured to increment time point from a start time point for each sampling period and control the matrix multiplication circuitry and the time evolution circuitry to perform a process for each time point. The output circuitry is configured to output N first variables at a preset end time point.

A calculation apparatus 10 according to embodiments will be described in detail below with reference to the drawings. The calculation apparatus 10 according to embodiments aims to solve optimization problems using the Ising model.

Preconditions

First of all, preconditions for a process performed in the calculation apparatus 10 will be described.

Energy $E_{Ising}$ of the Ising model is given by Eq. (1) below.

$$E_{Ising} = -\frac{1}{2}\sum_{i=0}^{N-1}\sum_{j=0}^{N-1}J_{i,j}s_i s_j + \sum_{i=0}^{N-1}h_i s_i \quad (1)$$

In Eq. (1), N is the number of spins; $s_i$ is a state of the $i^{th}$ spin, for example, $s_i=\pm 1$; $s_j$ is a state of the $j^{th}$ spin, for example, $s_j=\pm 1$; i and j are integers equal to or greater than zero and equal to or smaller than (N−1). In Eq. (1), $J_{i,j}$ is a coefficient in the $i^{th}$ row and $j^{th}$ column included in an N-by-N coefficient matrix $J_{i,j}$ denotes the interaction between the $i^{th}$ spin and the $j^{th}$ spin. The coefficient matrix J is, for example, a real symmetric matrix. The real symmetric matrix is a matrix in which all diagonal entries (diagonal elements) are zero. In Eq. (1), $h_i$ is the $i^{th}$ coefficient included in N coefficient arrays and denotes the action individually acting on the $i^{th}$ spin. The problem of searching for a spin state (ground state) with the minimum energy $E_{Ising}$ in the Ising model is called the Ising problem. A machine solving the Ising problem may be called Ising machine. The coefficient matrices J and h are input to the Ising machine, which calculates and outputs a near optical solution of the ground state or the lower energy.

A classical model of quantum bifurcation machines (hereinafter called classical bifurcation machine) has been proposed. The classical bifurcation machine calculates the optimal solution for Eq. (1), using the equations of motion given by simultaneous ordinary differential equations of Eq. (2), Eq. (3), and Eq. (4).

$$\frac{dx_j}{dt} = \frac{\partial H}{\partial y_i} = y_i\{D + p(t) + K(x_i^2 + y_i^2)\} - c\sum_{j=0}^{N-1} J_{i,j} y_j \quad (2)$$

$$\frac{dy_i}{dt} = -\frac{\partial H}{\partial x_i} = x_i\{-D + p(t) - K(x_i^2 + y_i^2)\} - ch_i a(t) + c\sum_{j=0}^{N-1} J_{i,j} x_j \quad (3)$$

$$H = \sum_{j=0}^{N-1}\left[\frac{D}{2}(x_i^2 + y_i^2) - \frac{p(t)}{2}(x_i^2 - y_i^2) + \frac{K}{4}(x_i^2 + y_i^2)^2 + ch_i x_i a(t) - \frac{c}{2}\sum_{j=1}^{N} J_{i,j}(x_i x_j + y_i y_j)\right] \quad (4)$$

In Eq. (2), Eq. (3), and Eq. (4), N is the number of mass points, an integer equal to or greater than two, and N corresponds to the number of spins; $x_i$ is a real number denoting the position of the $i^{th}$ mass point; $y_i$ is a real number denoting the kinetic momentum of the $i^{th}$ mass point; and i and j are integers from zero to (N−1).

In Eq. (2), Eq. (3), and Eq. (4), $J_{i,j}$ is a coefficient in the $i^{th}$ row and $j^{th}$ column included in a coefficient matrix J including predetermined coefficients in N rows and N columns. The coefficient matrix J is, for example, a real symmetric matrix. In the equations, $h_i$ is the $i^{th}$ coefficient included in predetermined N coefficient arrays. In Eq. (2), Eq. (3), and Eq. (4), the term $h_i$ may be eliminated.

In Eq. (2), Eq. (3), and Eq. (4), D is, for example, a constant corresponding to detune; c is a constant; and K is, for example, a constant corresponding to the Kerr coefficient. For example, D, c, and K are predetermined.

In Eq. (2), Eq. (3), and Eq. (4), t is a time point; p(t) is, for example, a function of t, a pump rate; a(t) is a function of t, and a(t) is given, for example, by Eq. (5) below.

$$a(t) = \sqrt{p(t)/K} \quad (5)$$

The classical bifurcation machine updates $x_i$ and $y_i$ using Eq. (2) and Eq. (3), every t, by incrementing t by a short time from zero to a sufficiently large value. The classical bifurcation machine then outputs a sign (±1) of the final value of $x_i$ when t is sufficiently large, as the optimal solution for $s_i$. In this way, the classical bifurcation machine considers the Ising model as Hamiltonian mechanics, where H in Eq. (2), Eq. (3), and Eq. (4) is Hamiltonian.

Simulated annealing is known as a method of calculating the optimal solution to the Ising model. In this method, a sequential update algorithm is employed. The sequential update algorithm selects a plurality of spins one by one and successively updates them. This sequential update algorithm is not suitable for parallel calculations and hardly achieves higher speed.

In this respect, another possible algorithm is to solve the equation of motion in the classical bifurcation machine using a discrete solution method with a digital calculator. Unlike simulated annealing, this algorithm can simultaneously update a plurality of variables.

However, the classical bifurcation machine has to perform matrix multiplication using the coefficient matrix J with greatest computational complexity in order to calculate $x_i$ and $y_i$. Moreover, the classical bifurcation machine has to solve the equations of motion given by Eq. (2), Eq. (3), and Eq. (4) by performing the discrete solution method (for example, the fourth-order Runge-Kutta method) with high computational cost. Thus, the classical bifurcation machine suffers from enormous computational complexity.

By contrast, the calculation apparatus 10 according to embodiments calculates the optimal solution of Eq. (1), using the equations of motion given by new simultaneous ordinary differential equations in Eq. (6), Eq. (7), and Eq. (8) below.

$$\frac{dx_i}{dt} = \frac{\partial H'}{\partial y_i} = Dy_i \quad (6)$$

$$\frac{dy_i}{dt} = -\frac{\partial H'}{\partial x_i} = \{-D + p(t) - Kx_i^2\}x_i - ch_i a(t) + c\sum_{j=0}^{N-1} J_{i,j} x_j \quad (7)$$

$$H' = \sum_{i=0}^{N-1}\left[\frac{D}{2}(x_i^2 + y_i^2) - \frac{p(t)}{2}x_i^2 + \frac{K}{4}x_i^4 + ch_i x_i a(t) - \frac{c}{2}\sum_{j=0}^{N-1} J_{i,j} x_i x_j\right] \quad (8)$$

In Eq. (6), Eq. (7), and Eq. (8), N, $x_i$, $y_i$, i, j, $J_{i,j}$, $h_i$, D, c, K, t, p(t), and a(t) are the same as in Eq. (2) to Eq. (4).

The calculation apparatus 10 according to embodiments updates $x_i$ and $y_i$ using Eq. (6) and Eq. (7), every t, by incrementing t by a short time from zero to a sufficiently large value. The calculation apparatus 10 according to embodiments then outputs a sign (±1) of the final value of $x_i$ when t is sufficiently large, as the optimal solution for $s_i$. In this way, the calculation apparatus 10 according to embodiments solves the Ising problem by simulating time evolution of Hamiltonian mechanics, where H in Eq. (8) is Hamiltonian.

In Eq. (6), Eq. (7), and Eq. (8), the matrix multiplication for the coefficient matrix J with greatest computational complexity is included in Eq. (7) but not included in Eq. (6). Therefore, the calculation apparatus according to embodiments has to perform matrix multiplication for the coefficient matrix J with greatest computational complexity only for updating $y_i$ and does not have to perform for updating $x_i$. In Eq. (6) for calculating the time derivative value of $x_i$ ($dx_i/dt$), p(t) is erased. Therefore, the calculation apparatus 10 according to embodiments can calculate the optimal solution to the Ising model with small computational complexity.

Eq. (6) for calculating the time derivative value of $x_i$ ($dx_i/dt$) includes $y_i$ but does not include $x_i$. Eq. (7) for calculating the time derivative value of $y_i$ ($dy_i/dt$) includes $x_1$ but does not include $y_i$.

In other words, when Eq. (6) and Eq. (7) are used, $x_i$ and $y_i$ are separate from each other in Hamiltonian. Therefore, the calculation apparatus 10 according to embodiments can update $x_i$ and $y_i$ by employing a discrete solution method that is stable with small computational complexity. For example, the calculation apparatus 10 according to embodiments updates $x_i$ and $y_i$, for example, using the symplectic Euler method. Therefore, the calculation apparatus 10 according to embodiments can calculate the optimal solution to an optimization problem using the Ising model, with simple computation and a simple configuration.

The calculation apparatus 10 according to embodiments may calculate the optimal solution for Eq. (1), using the equations of motion given by new simultaneous ordinary differential equations in Eq. (9) and Eq. (10).

$$\frac{dx_i}{dt} = Dy_i \quad (9)$$

$$\frac{dy_i}{dt} = \{[-D + p(t)](1 + x_i^n) - Kx_i^{n+2}\}x_i - ch_i a(t) + c\sum_{j=0}^{N-1} J_{i,j} x_j \quad (10)$$

In Eq. (9) and Eq. (10), N, $x_i$, $y_i$, i, j, $J_{i,j}$, $h_i$, D, c, K, t, p(t), and a(t) are the same as in Eq. (2) to Eq. (4). In Eq. (9) and Eq. (10), n is an even number equal to or greater than two.

In this case, the calculation apparatus 10 according to embodiments updates $x_i$ and $y_i$ using Eq. (9) and Eq. (10), every t, by incrementing t by a short time from zero to a sufficiently large value. The calculation apparatus 10 according to embodiments then outputs a sign (±1) of the final value of $x_i$ when t is sufficiently large, as the optimal solution for $s_i$.

Here, the matrix multiplication for the coefficient matrix J with greatest computational complexity is included in Eq. (9) but not included in Eq. (10). Therefore, also when Eq. (9) and Eq. (10) are used, the calculation apparatus 10 according to embodiments performs matrix multiplication for the coefficient matrix J with greatest computational complexity only for updating $y_i$ and does not have to perform for updating $h_i$. In Eq. (9) for calculating the time derivative value of $x_i$ ($dx_i/dt$), p(t) is erased. Therefore, also when Eq. (9) and Eq. (10) are used, the calculation apparatus 10 according to embodiments can calculate the optimal solution to an optimization problem using the Ising model with small computational complexity.

Eq. (9) for calculating the time derivative value of $x_i$ ($dx_i/dt$) includes $y_i$ but does not include $x_i$. Eq. (10) for calculating the time derivative value of $y_i$ ($dy_i/dt$) includes $x_i$ but does not include $y_i$.

That is, also when Eq. (9) and Eq. (10) are used, $x_i$ and $y_i$ are separate from each other in Hamiltonian. Therefore, also when Eq. (9) and Eq. (10) are used, the calculation apparatus 10 according to embodiments can calculate the optimal solution to an optimization problem using the Ising model with simple computation and a simple configuration, in the same manner as when Eq. (6) and Eq. (7) are used.

First Embodiment

The calculation apparatus 10 according to a first embodiment will be described. In the description of embodiments, the device, block, or circuitry having substantially the same function and configuration as the device, block, and circuitry that have been described before are denoted by the same reference signs and will not be further elaborated except for differences.

FIG. 1 is a diagram illustrating a configuration of the calculation apparatus 10 according to the first embodiment. The calculation apparatus 10 is a device that solves an optimization problem using Ising model, using the simultaneous ordinary differential equations in Eq. (7) and Eq. (8) or using the simultaneous ordinary differential equations in Eq. (9) and Eq. (10).

The calculation apparatus 10 includes a computing unit 20, an input unit 22, an output unit 24, and a setting unit 26.

The computing unit 20 is, for example, an arithmetic processing unit including one or more processors such as central processing units (CPU), each including circuitry, and a memory. The computing unit 20 may include circuitry disclosed in the second and following embodiments.

The computing unit 20 increments t, which is a parameter representing a sampling time point, by a short time (dt) from the start time point (for example, 0). The computing unit 20 updates N first variables $x_i$ and N second variables $y_i$, for each sampling time point, using the simultaneous ordinary differential equations in Eq. (6) and Eq. (7) or the simultaneous ordinary differential equations in Eq. (9) and Eq. (10). The computing unit 20 then outputs N first variables $x_i$ at the end time point T which is a predetermined sampling time point.

The input unit 22 acquires N first variables $x_i$ and N second variables $y_i$ at the start time point and provides the acquired variables to the computing unit 20, prior to the computation process by the computing unit 20. N first variables $x_i$ and N second variables $y_i$ at the start time point may be, for example, values generated by random numbers or may be preset values (for example, all zero or all predetermined values).

The output unit 24 acquires N first variables $x_i$ at the end time point T after the end of the computation process by the computing unit 20. The output unit 24 then outputs a value representing the sign (for example, +1, −1) of N first variables $x_i$ at the end time point T, as the optimal solution of a combination of N spin states in the Ising model.

The setting unit 26 sets the parameters used in the simultaneous ordinary differential equations in Eq. (6) and Eq. (7) and the simultaneous ordinary differential equations in Eq. (9) and Eq. (10) for the computing unit 20, prior to the computation process by the computing unit 20. More specifically, the setting unit 26 sets N, J, h, D, c, K, p(t), and a(t), where N is an integer equal to or greater than two, representing the number of the first variables and the second variables;

J is an N-by-N coefficient matrix, $J_{i,j}$ is a coefficient in the $i^{th}$ row and $j^{th}$ column included in the coefficient matrix J;

h is a coefficient array including N coefficients, $h_i$ is the $i^{th}$ coefficient in the coefficient array h;

D, c, and K are constants;

p(t) is a function of the sampling time point; and a(t) is a function of the sampling time point.

The setting unit 26 may further set dt, T, and M, where dt is a constant representing a sampling period (short time);

T is a constant representing a sampling time point corresponding to the end time point; and M is an integer equal to or greater than one, representing the number of iterations of computation in Eq. (6) and Eq. (7) or the number of iterations of computation in Eq. (9) and Eq. (10).

The setting unit 26 may optionally change some of these parameters in accordance with the user operation. Alternatively, the setting unit 26 may set these parameters as fixed values rather than changing them for each computation.

Figure 2:
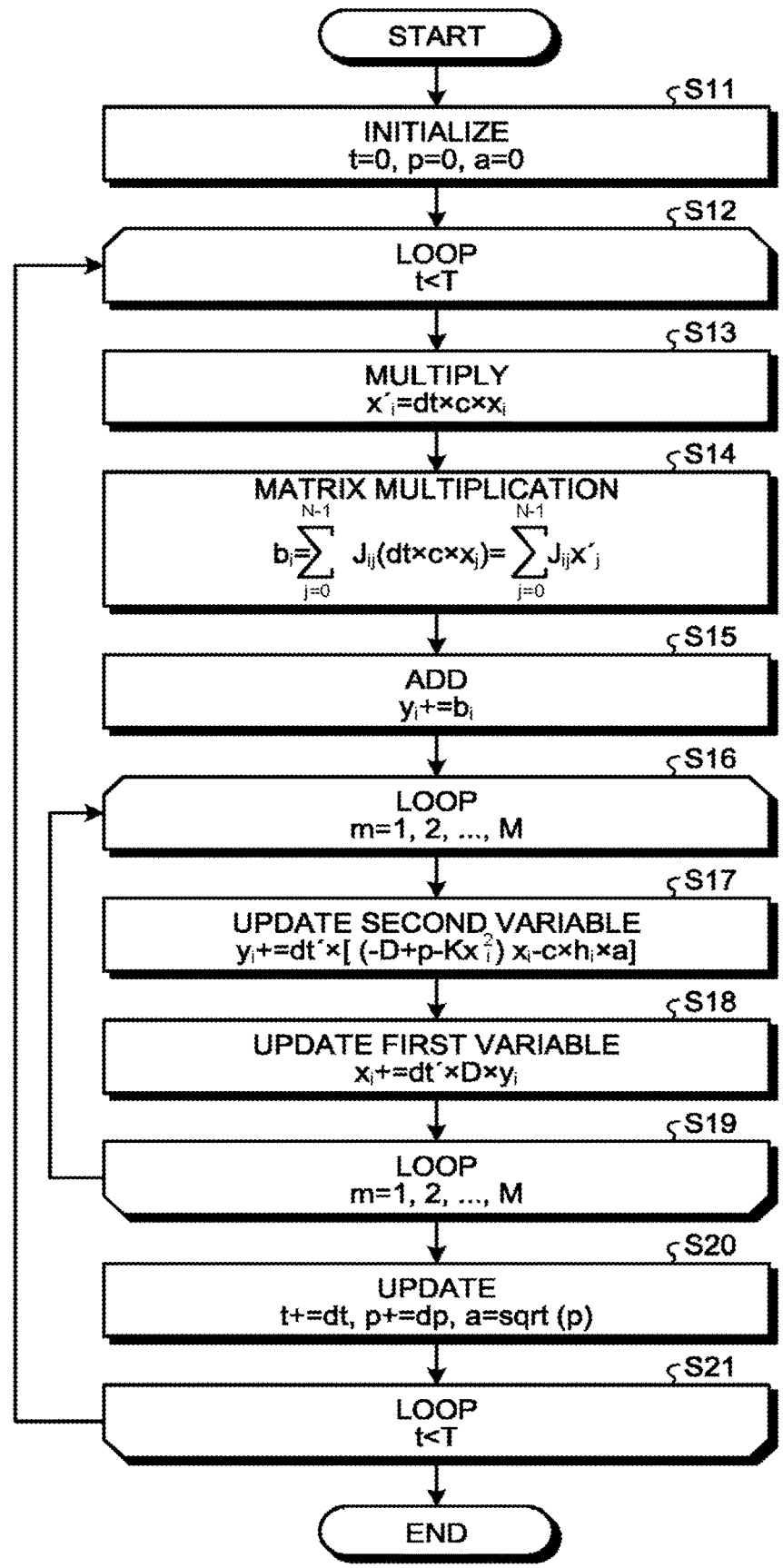
FIG. 2 is a flowchart illustrating a process flow in a computing unit.

FIG. 2 is a flowchart illustrating a process flow in the computing unit 20.

At S11, the computing unit 20 initializes t, p, and a. For example, the computing unit 20 sets all of t, p, and a to zero, where t is a parameter representing a sampling time point, p is a parameter representing the value of p(t) at the time point t, and a is a parameter representing the value of a(t) at the time point t.

Subsequently, the computing unit 20 repeats the process from S13 to S20 until t reaches an end time point T which is preset (the loop process between S12 and S21). When a(t) is an increasing function, the computing unit 20 may repeat the process from S13 to S20 until a reaches a predetermined value or greater.

At S13, the computing unit 20 calculates N first intermediate variables $x'_i$ by multiplying each of N first variables $x_i$ by the sampling period (short time) dt and a preset coefficient c. That is, at S13, the computing unit performs computation of Eq. (21) below.

$$x'_i = dt \times c \times x_i \quad (21)$$

Subsequently, at S14, the computing unit 20 calculates N second intermediate variables $b_1$ by performing matrix multiplication between N first intermediate variables $x'_i$ and the coefficient matrix J including preset coefficients in N rows and N columns. That is, at S14, the computing unit 20 performs computation of Eq. (22) below.

$$b_i = \sum_{j=0}^{N-1} J_{ij}(dt \times c \times x_j) = \sum_{j=0}^{N-1} J_{ij} x'_j \quad (22)$$

The computing unit 20 may perform the process at S13 after performing the process at S14. In this case, at S14, the computing unit 20 calculates N values by performing matrix multiplication between N first variables $x_i$ and the coefficient matrix J. Subsequently, at S13, the computing unit 20 calculates N second intermediate variables $b_i$ by multiplying each of N values calculated at S14 by (dt×c).

Subsequently, at S15, the computing unit 20 updates N second variables $y_i$ by adding the corresponding second intermediate variable $b_i$ to each of N second variables $y_i$. That is, at S15, the computing unit 20 performs computation of Eq. (23) below.

$$y_i += b_i \quad (23)$$

Subsequently, the computing unit 20 performs the process from S17 to S18 iteratively M times (the loop process between S16 to S19). M is an integer equal to or greater than one.

At S17, the computing unit 20 updates the second variable $y_i$ by performing computation according to Eq. (7) or Eq. (10). For example, at S17, the computing unit 20 performs computation of Eq. (24) below when performing computation according to Eq. (7).

$$y_i += dt' \times [(-D+p-Kx_i^2)x_i - c \times h_i \times a] \quad (24)$$

For example, at S17, the computing unit 20 performs computation of Eq. (25) below when performing computation according to Eq. (10). In Eq. (25), n is an even number equal to or greater than two.

$$y_i += dt' \times \{[(-D+p)(1+x_i^n) - Kx_i^{n+2}]x_i - c \times h_i \times a\} \quad (25)$$

Subsequently, at S18, the computing unit 20 updates the first variable $x_i$ by performing computation according to Eq. (6) or Eq. (9). Eq. (6) and Eq. (9) are the same equations. For example, at S18, the computing unit 20 performs computation of Eq. (26) below when performing computation according to Eq. (6) or Eq. (9).

$$x_i += dt' \times D \times y_i \quad (26)$$

The loop process from S16 to S19 corresponds to iterative computation in the symplectic Euler method. The computing unit 20 may perform the process at S17 and the process at S18 in reverse. That is, the computing unit 20 may update the second variable $y_i$ after updating the first variable $x_i$.

After performing the loop process from S16 to S19, the computing unit 20 proceeds to S20. At S20, the computing unit 20 updates t by adding dt to t. The computing unit 20 further updates p and a. For example, the computing unit 20 updates p by adding a preset dp to p. The computing unit 20 also updates a by computing the square root of the updated p.

After performing the process at S20, the computing unit 20 determines whether t is equal to or greater than T. If t is smaller than T, the computing unit 20 returns to S13 and repeats the process from S13. If t is equal to or greater than T, the computing unit 20 terminates this flow.

By performing the process as described above, the calculation apparatus 10 according to the first embodiment can solve an optimization problem, using the simultaneous ordinary differential equations in Eq. (6) and Eq. (7) or the simultaneous ordinary differential equations in Eq. (9) and Eq. (10). The calculation apparatus 10 according to the first embodiment can update the first variable $x_i$ and the second variable $y_i$ at high speed with simple computation or a simple configuration. The calculation apparatus 10 according to the first embodiment therefore can calculate the optimal solution to an optimization problem at a small cost and at high speed.

Second Embodiment

The calculation apparatus 10 according to a second embodiment will be described.

Figure 3:
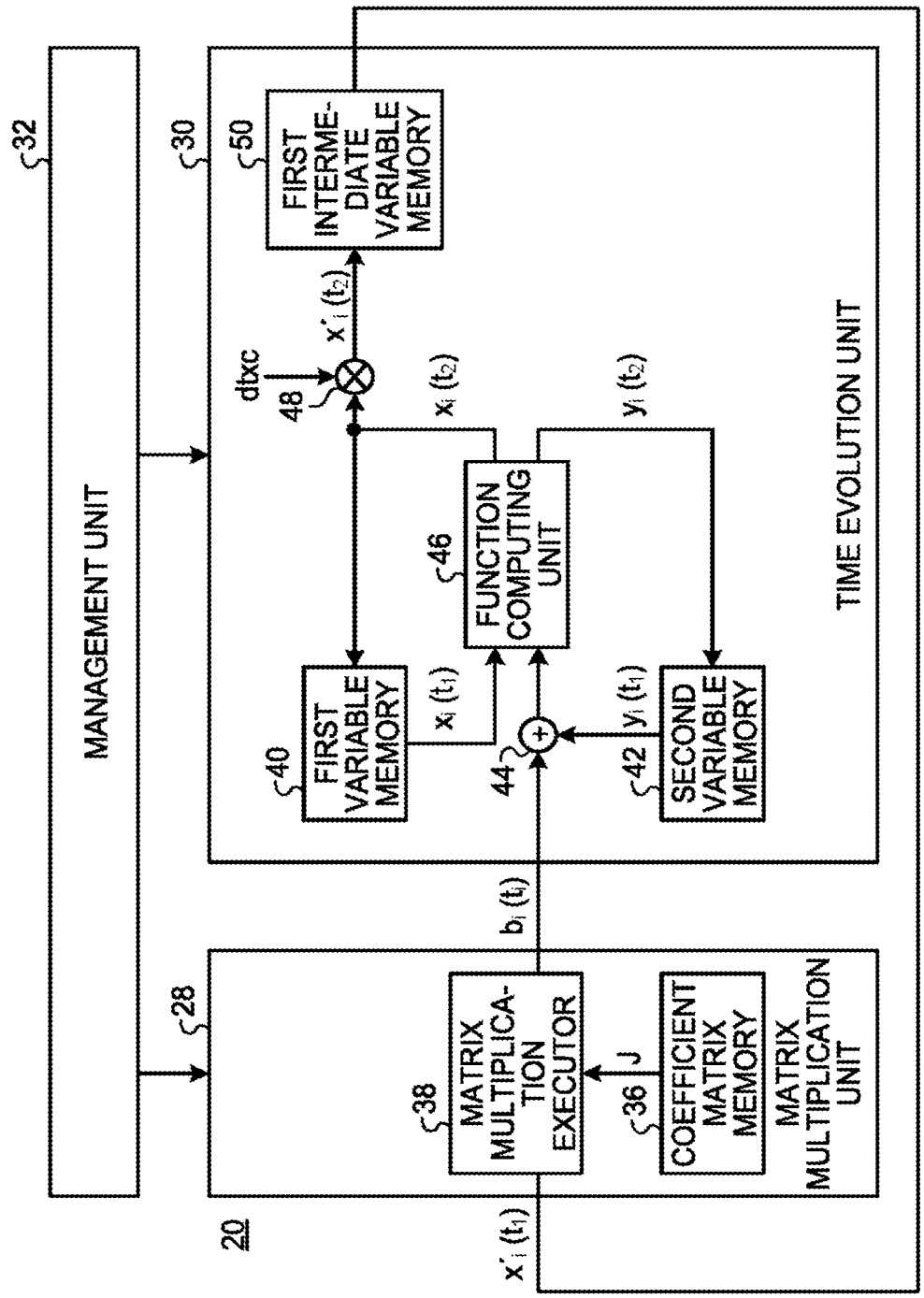
FIG. 3 is a configuration diagram of the computing unit according to a second embodiment.

FIG. 3 is a diagram illustrating a configuration of the computing unit 20 according to the second embodiment. In the second embodiment, the calculation apparatus 10 includes circuitry implemented by one or more semiconductor devices. The calculation apparatus 10 may be, for example, a field programmable gate array (FPGA), a gate array, or an application specific integrated circuit (ASIC). The calculation apparatus 10 may partially include a processor.

The computing unit 20 according to the second embodiment includes a matrix multiplication unit 28, a time evolution unit 30, and a management unit 32.

The matrix multiplication unit 28 acquires N first intermediate variables $x'_i(t_1)$ at a first time point $t_1$ representing any sampling time point from the time evolution unit 30. The matrix multiplication unit 28 calculates N second intermediate variables $b_i(t_1)$ at the first time point $t_1$ by performing matrix multiplication between N first intermediate variables $x'_i(t_1)$ at the first time point $t_1$ and the coefficient matrix J.

For example, the matrix multiplication unit 28 includes a coefficient matrix memory 36 and a matrix multiplication executor 38. The coefficient matrix memory 36 stores the coefficient matrix J. The matrix multiplication executor 38 performs matrix multiplication between N first intermediate variables $x'_i(t_1)$ at the first time point $t_1$ and the coefficient matrix J.

The time evolution unit 30 acquires N second intermediate variables $b_i(t_1)$ at the first time point $t_1$ from the matrix multiplication unit 28. The time evolution unit 30 calculates N first variables $x_i(t_2)$ at a second time point $t_2$ representing a sampling time point following one sampling period after the first time point $t_1$, N second variables $y_i(t_2)$ at the second time point $t_2$, and N first intermediate variables $x'_i(t_2)$ at the second time point $t_2$, based on N second intermediate variables $b_i(t_1)$ at the first time point $t_1$.

The management unit 32 increments the sampling time point for each sampling period after the start time point. The management unit 32 then controls the matrix multiplication unit 28 and the time evolution unit 30 to perform the process for each sampling time point.

More specifically, the management unit 32, for example, controls the matrix multiplication unit 28 to calculate N second intermediate variables $b_i(t_1)$ at the first time point $t_1$. Subsequently, the management unit 32 controls the time evolution unit 30 to calculate N first variables $x_i(t_2)$, N second variables $y_i(t_2)$, and N first intermediate variables $x'_i(t_2)$ at the second time point $t_2$. Subsequently, the management unit 32 controls the matrix multiplication unit 28 to calculate N second intermediate variables $b_i(t_2)$ at the second time point $t_2$. Subsequently, the management unit 32 controls the time evolution unit 30 to calculate N first variables $x_i(t_3)$, N second variables $y_i(t_3)$, and N first intermediate variables $x'_i(t_3)$ at a third time point $t_3$ representing a sampling time point following one sampling period after the second time point $t_2$. In this way, the management unit 32 alternately controls the matrix multiplication unit 28 and the time evolution unit 30 to perform the process while incrementing the sampling time point.

N first variables $x_i(t_0)$ and N second variables $y_i(t_0)$ at the start time point (for example, $t_0$) are provided in advance by the input unit 22, for example, prior to the computation process.

For example, the time evolution unit 30 includes a first variable memory 40, a second variable memory 42, a first addition unit 44, a function computing unit 46, a first multiplication unit 48, and a first intermediate variable memory 50.

The first variable memory 40 stores N first variables $x_i(t_1)$ at the first time point $t_1$. The second variable memory 42 stores N second variables $y_i(t_1)$ at the first time point $t_1$.

The first addition unit 44 acquires N second intermediate variables $b_i(t_1)$ at the first time point $t_1$ calculated by the matrix multiplication unit 28. The first addition unit 44 updates N second variables $y_i(t_1)$ at the first time point $t_1$ by adding N second intermediate variables $b_i(t_1)$ at the first time point $t_1$ to N second variables $y_i(t_1)$ at the first time point $t_1$ stored in the second variable memory 42. For example, the first addition unit 44 updates N second variables $y_i(t_1)$ in the order of index from the second variable $y_0(t_1)$ with an initial index (i=0) to the second variable $y_{N-1}(t_1)$ with the last index (i=N−1).

In embodiments, adding N first values and N second values refer to adding values with the same index to generate N third values.

The function computing unit 46 calculates N first variables $x_i(t_2)$ at the second time point $t_2$ and N second variables $y_i(t_2)$ at the second time point $t_2$, based on N first variables $x_i(t_1)$ at the first time point $t_1$ stored in the first variable memory 40 and the updated N second variables $y_i(t_1)$ at the first time point $t_1$ calculated by the first addition unit 44. For example, the function computing unit 46 calculates N first variables $x_i(t_2)$ and N second variables $y_i(t_2)$ in the order of index from the first variable $x_0(t_2)$ and the second variable $y_0(t_2)$ with the initial index (i=0) to the first variable $x_{N-1}(t_2)$ and the second variable $y_{N-1}(t_2)$ with the last index (i=N−1).

The function computing unit 46 writes N first variables $x_i(t_2)$ at the second time point $t_2$ into the first variable memory 40. For example, the function computing unit 46 writes each of N first variables $x_i(t_2)$ at the second time point $t_2$ into the first variable memory 40 in order from the first variable $x_0(t_2)$ with the initial index (i=0). The first variable memory 40 is, for example, a dual port memory and can write data into an address while reading data at another address. When the first variable memory 40 is a dual port memory, the function computing unit 46 can write N first variables $x_i(t_2)$ at the second time point $t_2$ onto the address at which N first variables $x_i(t_1)$ at the first time point $t_1$ are stored.

The function computing unit 46 writes N second variables $y_i(t_2)$ at the second time point $t_2$ into the second variable memory 42. For example, the function computing unit 46 writes each of N second variables $y_i(t_2)$ at the second time point $t_2$ into the second variable memory 42, in order from the second variable $y_0(t_2)$ with the initial index. The second variable memory 42 is, for example, a dual port memory. When the second variable memory 42 is a dual port memory, the function computing unit 46 can write N second variables $y_i(t_2)$ at the second time point $t_2$ onto the address at which N second variables $y_i(t_1)$ at the first time point $t_1$ are stored.

The first multiplication unit 48 calculates N first intermediate variables $x'_i(t_2)$ at the second time point $t_2$ by multiplying each of N first variables $x_i(t_2)$ at the second time point $t_2$ by a preset value (in the present embodiment, (dt×c)). The first intermediate variable memory 50 stores N first intermediate variables $x'_i(t_2)$ at the second time point $t_2$ calculated by the first multiplication unit 48. N first intermediate variables $x'_i(t_2)$ at the second time point $t_2$ are temporarily stored in the first intermediate variable memory 50 and then transmitted to the matrix multiplication unit 28. The first intermediate variable memory 50 holds each of N first intermediate variables $x'_i(t_2)$ at the second time point $t_2$ for a period from when it is generated by the first multiplication unit 48 to when it is transmitted to the matrix multiplication unit 28. The first intermediate variable memory 50 may include, for example, a first-in first-out (FIFO) memory.

In such a configuration, the matrix multiplication unit 28 performs the process at S14 described in the first embodiment. The first addition unit 44 performs the process at S15. The function computing unit 46 performs the process from S16 to S19. The first multiplication unit 48 performs the process at S13. The management unit 32 performs management in S11, S20, and the loop process between S12 to S21. The computing unit 20 according to the second embodiment therefore can calculate the optimal solution to an optimization problem at a small cost at high speed, as in the first embodiment.

The first multiplication unit 48 may be provided at a stage before the first addition unit 44, instead of the stage before the first intermediate variable memory 50. This change in arrangement corresponds to the process in which S13 and S14 are reversed in the first embodiment. However, when the value (in the present embodiment (dt×c)) by which each of N first variables $x_i(t_2)$ at the second time point $t_2$ is multiplied is smaller than one, it is preferable that the first multiplication unit 48 is provided at a stage before the first intermediate variable memory 50. The first multiplication unit 48 thus can reduce the number of digits of N first intermediate variables $x'_i(t_2)$ at the second time point $t_2$, thereby reducing the probability of overflow in the matrix multiplication unit 28.

When the first multiplication unit 48 is provided at a stage before the first addition unit 44, the first intermediate variable memory 50 stores N first variables $x_i(t_2)$ at the second time point $t_2$ as N first intermediate variables $x'_i(t_2)$ at the second time point $t_2$. In this case, the first multiplication unit 48 multiplies each of N second intermediate variables $b_i(t_1)$ at the first time point $t_1$ output from the matrix multiplication unit 28 by a preset value (dt×c). Then, in this case, the first addition unit 44 updates N second variables $y_i(t_1)$ at the first time point $t_1$ by adding N second intermediate variables $b_i(t_1)$ at the first time point $t_1$ multiplied by a preset value (dt×c) by the first multiplication unit 48 to N second variables $y_i(t_1)$ at the first time point $t_1$.

The time evolution unit 30 may output N first intermediate variables $x'_i(t_1)$ at the first time point $t_1$ as a first intermediate stream X' including a first number (the first number is an integer equal to or greater than one) of first intermediate variables $x'_i(t_1)$ in one clock cycle to the matrix multiplication unit 28. The matrix multiplication unit 28 may output N second intermediate variables $b_i(t_1)$ at the first time point $t_1$ as a second intermediate stream B including a second number (the second number is an integer equal to or greater than one) of second intermediate variables $b_i(t_1)$ in one clock cycle to the time evolution unit 30.

Here, a stream refers to time-series data. More specifically, a stream refers to a data row including P data sets in each clock cycle, where N pieces of data are divided into, for example, P data sets (P is an integer equal to or greater than one).

When acquiring such a stream, the matrix multiplication unit 28 and the time evolution unit 30 perform the process in order from data acquired earlier. The matrix multiplication unit 28 and the time evolution unit 30 thus can start the process before acquisition of all the data included in a stream is completed. When calculation of an initial data set of N pieces of data is completed, the matrix multiplication unit 28 and the time evolution unit 30 start successively transmitting the calculated data set. The matrix multiplication unit 28 and the time evolution unit 30 thus can control the next unit to start a process before calculation of all the data is completed.

Figure 4:
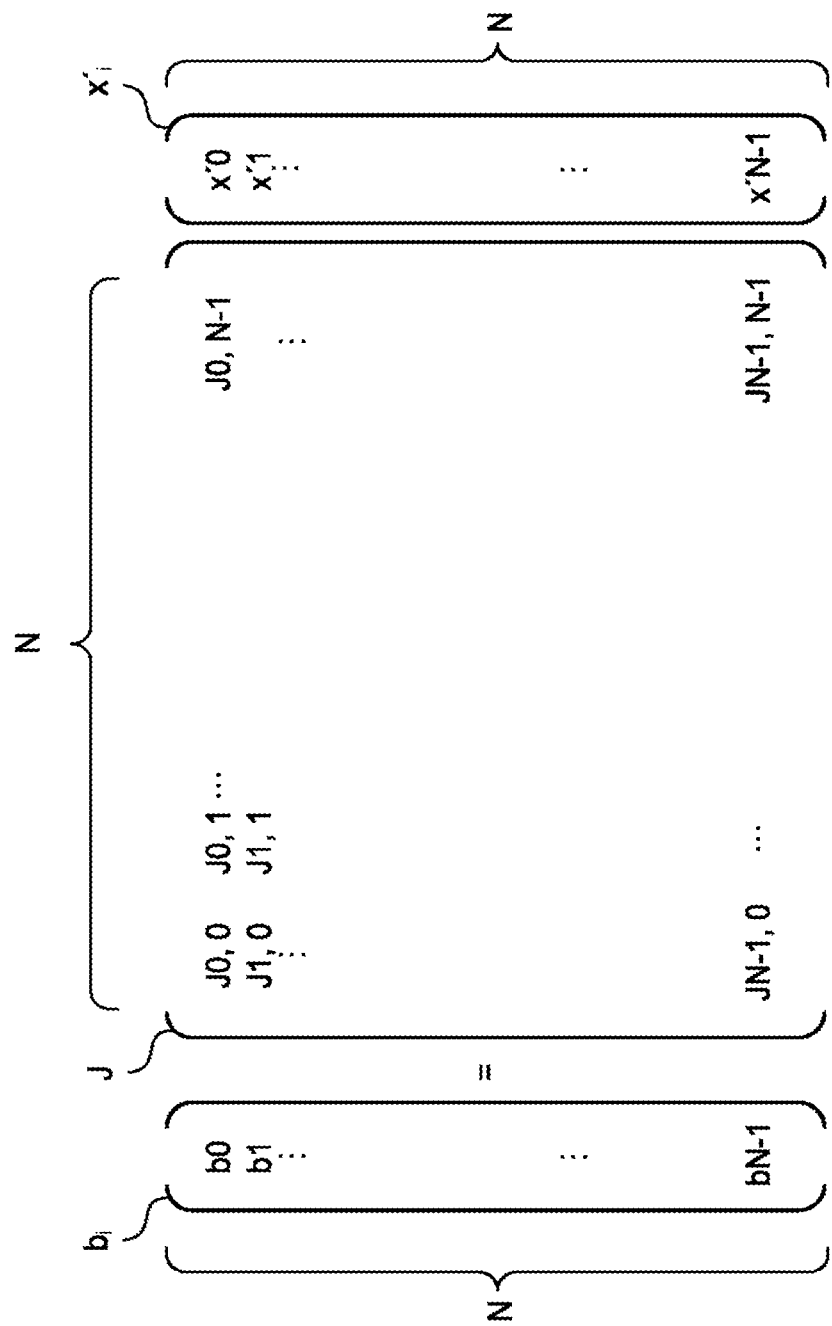
FIG. 4 is a relation diagram of variables and a coefficient matrix in the second embodiment.

FIG. 4 is a diagram illustrating the relation between N first intermediate variables $x'_i$, the coefficient matrix J, and N second intermediate variables $b_i$ in the second embodiment. The matrix multiplication unit 28 acquires N first intermediate variables $(x'_0, x'_1, x'_2, \ldots, x'_i, \ldots, x'_{N-1})$ for each sampling time point. The matrix multiplication unit 28 stores the coefficient matrix $(J_{0,0}, J_{0,1}, J_{0,2}, \ldots, J_{i,j}, \ldots, J_{N-1,N-1})$ including coefficients in N rows and N columns.

The matrix multiplication unit 28 then calculates N second intermediate variables $(b_0, b_1, b_2, \ldots, b_i, \ldots, b_{N-1})$ by performing matrix multiplication between N first intermediate variables $(x'_0, x'_1, x'_2, \ldots, x'_i, \ldots, x'_{N-1})$ and the coefficient matrix $(J_{0,0}, J_{0,1}, J_{0,2}, \ldots, J_{i,j}, \ldots, J_{N-1,N-1})$.

In the second embodiment, the matrix multiplication unit 28 may perform matrix multiplication by any process. In the second embodiment, the matrix multiplication unit 28 may include, for example, a processor in the inside to perform matrix multiplication under instructions of a program.

Figure 5:
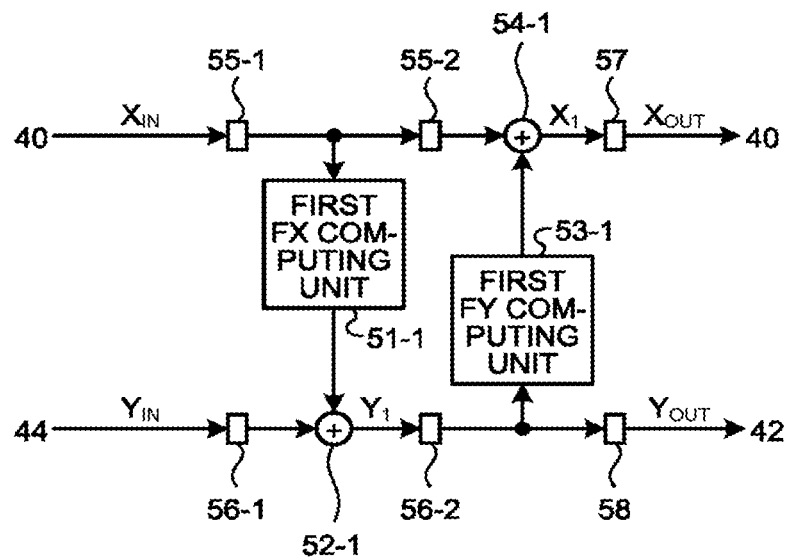
FIG. 5 is a diagram illustrating a first example of the configuration of a function computing unit.

FIG. 5 is a diagram illustrating a first example of the configuration of the function computing unit 46. The function computing unit 46 according to the first example includes a first FX computing unit 51-1, a first FX addition unit 52-1, a first FY computing unit 53-1, and a first FY addition unit 54-1.

The first FX computing unit 51-1 calculates N second derivative values by performing a first function operation $(FX(x_i))$ for each of N first variables at a first time point. The first FX addition unit 52-1 calculates N second update values by adding N second derivative values calculated by the first FX computing unit 51-1 and N updated second variables calculated by the first addition unit 44.

The first FY computing unit 53-1 calculates N first derivative values by performing a second function operation $(FY(y_i))$ for each of N second update values calculated by the first FX addition unit 52-1. The first FY addition unit 54-1 calculates N first update values by adding N first derivative values calculated by the first FY computing unit 53-1 and N first variables at the first time point.

The function computing unit 46 then provides N first update values calculated by the first FY addition unit 54-1 to the first variable memory 40. The first variable memory stores N first update values calculated by the first FY addition unit 54-1 as N first variables at a second time point.

The function computing unit 46 also provides N second update values calculated by the first FX addition unit 52-1 to the second variable memory 42. The second variable memory 42 stores N second update values calculated by the first FX addition unit 52-1 as N second variables at the second time point.

Here, the first function operation is computation of Eq. (31) below.

$$FX(x_i)=dt'\times[(-D+p-Kx_i^2)x_i-c\times h_i\times a] \quad (31)$$

The second function is computation of Eq. (32) below.

$$FY(y_i)=dt'\times D\times y_i \quad (32)$$

The first function operation may be computation of Eq. (33) below.

$$FX(x_i)=dt'\times\{[(-D+p)(1+x_i^n)-Kx_i^{n+2}]x_i-c\times h_i\times a\} \quad (33)$$

In Eqs. (31), (32), and (33), $x_i$ is the $i^{th}$ first variable of N first variables at the first time point or the $i^{th}$ first update values of N first update values; and $y_i$ is the $i^{th}$ second variable of the updated N second variables calculated by the first addition unit 44 or the $i^{th}$ second update value of N second update values.

dt' is a preset short time. D, c, and K are preset constants. $h_i$ is a coefficient set for each i. p and a are values increasing at each sampling time point according to a predetermined operation expression.

The function computing unit 46 having such a configuration in the first example can execute the loop process from S16 to S19 in the first embodiment once in the order of S17 to S18. The function computing unit 46 thus can time-evolve N first variables and N second variables at the first time point using the method called symplectic Euler method to calculate N first variables and N second variables at the second time point.

Further, the function computing unit 46 according to the first example may implement the computation by pipeline processing. When pipeline processing is performed, for example, the function computing unit 46 receives one variable pair including the first variable $X_{IN}$ and the second variable $Y_{IN}$ in the order of index for each clock cycle. The function computing unit 46 then performs computation for the received variable pair to calculate one variable pair including the first variable $X_{OUT}$ and the second variable Your computed.

Specifically, when pipeline processing is performed, the function computing unit 46 further includes two stages of X transfer registers 55-1 to 55-2, two stages of Y transfer registers 56-1 to 56-2, one X output register 57, and one Y output register 58.

For each clock cycle, the X transfer register 55-1 on the first stage acquires one first variable $X_{IN}$ from among N first variables at the first time point from the first variable memory 40 and holds the acquired one first variable $X_{IN}$ for one clock cycle period. For each clock cycle, the Y transfer register 56-1 on the first stage acquires one second variable $Y_{IN}$ from among the updated N second variables calculated by the first addition unit 44 and holds the acquired one second variable $Y_{IN}$ for one clock cycle period. The X transfer register 55-1 on the first stage and the Y transfer register 56-1 on the first stage acquire one first variable and one second variable with the same index i in the same clock cycle.

For each clock cycle, the first FX computing unit 51-1 calculates a second derivative value by performing the first function operation for the first variable $X_{IN}$ stored in the X transfer register 55-1 on the first stage. For each clock cycle, the first FX addition unit 52-1 calculates the second update value $Y_1$ by adding the second derivative value calculated by the first FX computing unit 51-1 in the clock cycle and the second variable $Y_{IN}$ stored in the Y transfer register 56-1 on the first stage.

For each clock cycle, the X transfer register 55-2 on the second stage acquires the first variable $X_{IN}$ held in the X transfer register 55-1 on the first stage in the immediately preceding clock cycle and holds the acquired first variable $X_{IN}$ for one clock cycle period. For each clock cycle, the Y transfer register 56-2 on the second stage acquires the second update value $Y_1$ calculated by the first FX addition unit 52-1 in the immediately preceding clock cycle and holds the acquired second update value $Y_1$ for one clock cycle period.

For each clock cycle, the first FY computing unit 53-1 calculates a first derivative value by performing the second function operation for the second update value $Y_1$ stored in the Y transfer register 56-2 on the second stage. For each clock cycle, the first FY addition unit 54-1 calculates the first update value $X_1$ by adding the first derivative value calculated by the first FY computing unit 53-1 in the clock cycle and the first variable $X_{IN}$ stored in the X transfer register 55-2 on the second stage.

For each clock cycle, the X output register 57 acquires the first update value $X_1$ calculated by the first FY addition unit 54-1 in the immediately preceding clock cycle and stores the acquired first update value $X_1$ as one first variable $X_{OUT}$ at the second time point into the first variable memory 40.

For each clock cycle, the Y output register 58 acquires the second update value $Y_1$ stored in the Y transfer register 56-2 on the second stage and stores the acquired second update value $Y_1$ as one second variable $Y_{OUT}$ at the second time point into the second variable memory 42.

By performing such pipeline processing, the function computing unit 46 according to the first example can perform the computation as described below, for each clock cycle.

$$Y_1 = FX(X_{IN}) + Y_{IN}$$

$$X_1 = FY(Y_1) + X_{IN}$$

$$Y_{OUT} = Y_1$$

$$X_{OUT} = X_1$$

Such a function computing unit 46 according to the first example can perform a series of computations of first function operation, FX addition, second function operation, and FY addition once for a variable pair including one first variable $X_{IN}$ and one second variable $Y_{IN}$ with the same index i. Further, the function computing unit 46 according to the first example performs pipeline processing and thus can perform computation for a plurality of variable pairs in parallel. The function computing unit 46 according to the first example thus can complete computation for N variable pairs in a short time.

Figure 6:
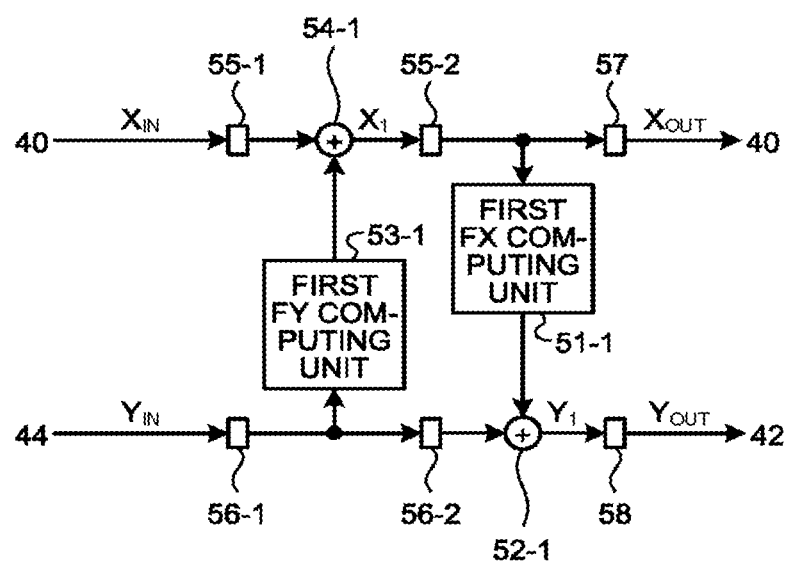
FIG. 6 is a diagram illustrating a second example of the configuration of the function computing unit.

FIG. 6 is a diagram illustrating a second example of the configuration of the function computing unit 46. The function computing unit 46 may have the configuration of the second example as illustrated in FIG. 6. The function computing unit 46 according to the second example has the same components as in the first example but differs in arrangement of the components. In a description of the second example, the components performing the same operation as in the first example are denoted by the same reference signs and will not be further elaborated except for differences.

The first FY computing unit 53-1 calculates N first derivative values by performing the second function operation (FY($y_i$)) for each of the updated N second variables calculated by the first addition unit 44. The first FY addition unit 54-1 calculates N first update values by adding N first derivative values calculated by the first FY computing unit 53-1 and N first variables at the first time point.

The first FX computing unit 51-1 calculates N second derivative values by performing the first function operation (FX($x_i$)) for each of N first update values calculated by the first FY addition unit 54-1. The first FX addition unit 52-1 calculates N second update values by adding N second derivative values calculated by the first FX computing unit 51-1 and the updated N second variables calculated by the first addition unit 44.

The function computing unit 46 having such a configuration in the second example can perform the loop process from S16 to S19 in the first embodiment once in the order of S18 to S17. The function computing unit 46 thus can time-evolve N first variables and N second variables at the first time point using a method called symplectic Euler method to calculate N first variables and N second variables at the second time point.

Further, the function computing unit 46 according to the second example may implement computation by pipeline processing. Also in this case, the function computing unit 46 according to the second example has the same components as in the first example but differs in arrangement of the components.

For each clock cycle, the first FY computing unit 53-1 calculates a first derivative value by performing the second function operation for the updated second variable $Y_{IN}$ stored in the Y transfer register 56-1 on the first stage. For each clock cycle, the first FY addition unit 54-1 calculates the first update value $X_1$ by adding the first derivative value calculated by the first FY computing unit 53-1 in the clock cycle and the first variable KIN stored in the X transfer register 55-1 on the first stage.

For each clock cycle, the X transfer register 55-2 on the second stage acquires the first update value $X_1$ calculated by the first FY addition unit 54-1 in the immediately preceding clock cycle and holds the acquired first update value $X_1$ for one clock cycle period. For each clock cycle, the Y transfer register 56-2 on the second stage acquires the second variable $Y_{IN}$ held by the Y transfer register 56-1 on the first stage in the immediately preceding clock cycle and holds the acquired second variable $Y_{IN}$ for one clock cycle period.

For each clock cycle, the first FX computing unit 51-1 calculates a second derivative value by performing the first function operation for the first update value $X_1$ stored in the X transfer register 55-2 on the second stage. For each clock cycle, the first FX addition unit 52-1 calculates the second update value $Y_1$ by adding the first derivative value calculated by the first FX computing unit 51-1 in the clock cycle and the second variable $Y_{IN}$ stored in the Y transfer register 56-2 on the second stage.

By performing such pipeline processing, the function computing unit 46 according to the second example can perform computation as described below, for each clock cycle.

$$X_1 = FY(Y_{IN}) + X_{IN}$$

$$Y_1 = FX(X_1) + Y_{IN}$$

$X_{OUT}=X_1$ $Y_{OUT}=Y_1$

Such a function computing unit 46 according to the second example can perform a series of computations of second function operation, FY addition, first function operation, and FX addition once for a variable pair including one first variable $X_{IN}$ and one second variable $Y_{IN}$ with the same index i. Further, the function computing unit 46 according to the second example performs pipeline processing and therefore can perform computation for a plurality of variable pairs in parallel. The function computing unit 46 according to the second example thus can complete computation for N variable pairs in a short time.

Figure 7:
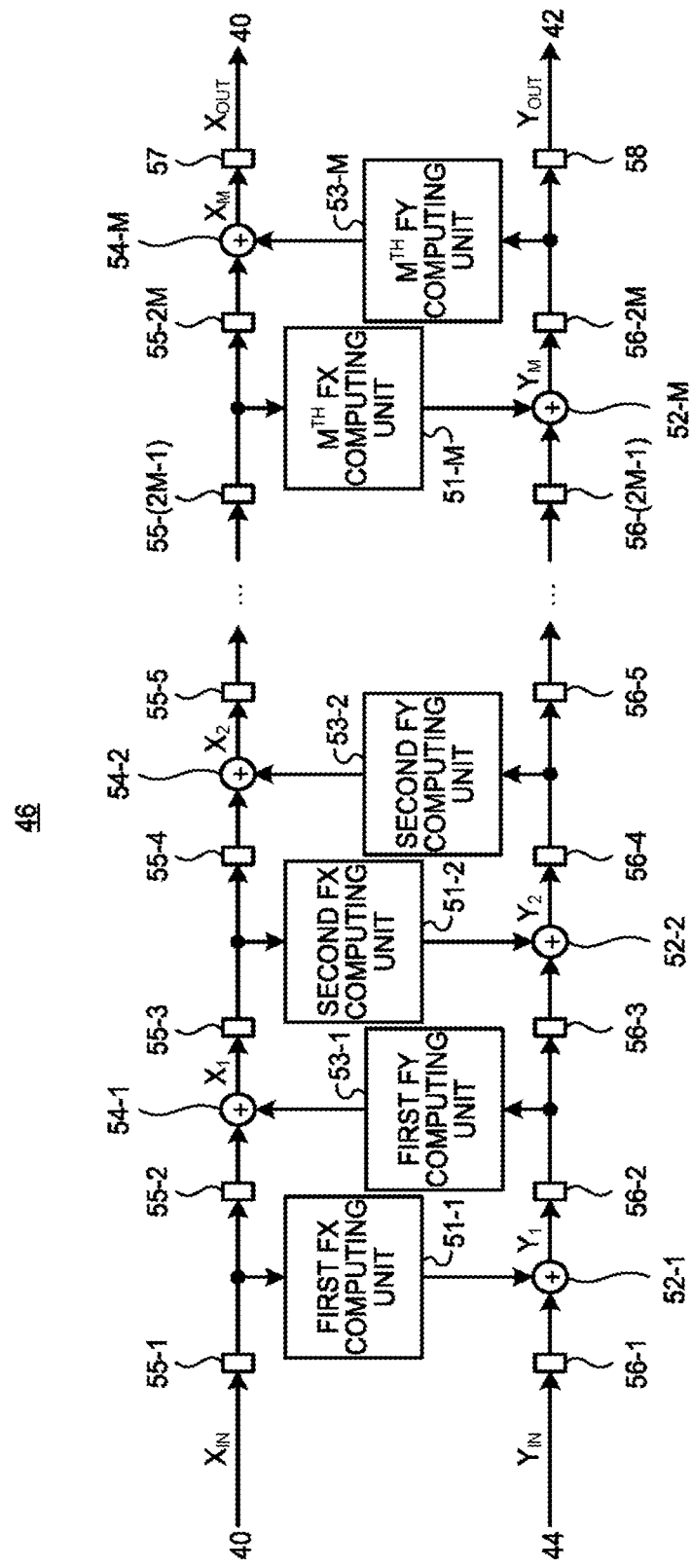
FIG. 7 is a diagram illustrating a third example of the configuration of the function computing unit.

FIG. 7 is a diagram illustrating a third example of the configuration of the function computing unit 46. The function computing unit 46 may have the configuration of the third example as illustrated in FIG. 7. The function computing unit 46 according to the third example has substantially the same configuration as the first example.

In a description of the third example, the components performing the same operation as in the first example are denoted by the same reference signs and will not be further elaborated except for differences.

The function computing unit 46 according to the third example further includes, in addition to the configuration of the first example, second to $M^{th}$ (M is an integer equal to or greater than two) (M−1) FX computing units 51-2 to 51-M, second to $M^{th}$ (M−1) FX addition units 52-2 to 52-M, second to $M^{th}$ (M−1) FY computing units 53-2 to 53-M, and second to $M^{th}$ (M−1) FY addition units 54-2 to 54-M.

The $m^{th}$ FX computing unit 51-$m$ (m is any integer from two to M) calculates N second derivative values by performing the first function operation for each of N first update values calculated by the $(m-1)^{th}$ FY addition unit 54-($m$−1). The $M^{th}$ FX addition unit 52-$m$ calculates new N second update values by adding N second derivative values calculated by the $m^{th}$ FX computing unit 51-$m$ and N second update values calculated by the $(m-1)^{th}$ FX addition unit 52-($m$−1).

The $M^{th}$ FY computing unit 53-$m$ calculates N first derivative values by performing the second function operation for each of N second update values calculated by the $m^{th}$ FX addition unit 52-$m$. The $m^{th}$ FY addition unit 54-$m$ calculates new N first update values by adding N first derivative values calculated by the $m^{th}$ FY computing unit 53-$m$ and N first update values calculated by the $(m-1)^{th}$ FY addition unit 54-($m$−1).

The function computing unit 46 then provides N first update values calculated by the $M^{th}$ FY addition unit 54-M to the first variable memory 40. The first variable memory stores N first update values calculated by the $M^{th}$ FY addition unit 54-M, as N first variables at the second time point.

The function computing unit 46 also provides N second update values calculated by the $M^{th}$ FX addition unit 52-M to the second variable memory 42. The second variable memory 42 stores N second update values calculated by the $M^{th}$ FX addition unit 52-M, as N second variables at the second time point.

The function computing unit 46 having such a configuration in the third example can perform the loop process from S16 to S19 in the first embodiment, M times, in the order of S17 to S18. The function computing unit 46 thus can time-evolve N first variables and N second variables at the first time point using a method called symplectic Euler method to calculate N first variables and N second variables at the second time point.

Further, the function computing unit 46 according to the third example may implement computation by pipeline processing. In this case, the function computing unit 46 further includes 2M stages of X transfer registers 55-1 to 55-2M, 2M stages of Y transfer registers 56-1 to 56-2M, one X output register 57, and one Y output register 58. In this configuration, the configuration illustrated in the first example performs the same operation as in the first example, except for the X output register 57 and the Y output register 58.

For each clock cycle, the X transfer register 55-($2m$−1) on the $(2m-1)^{th}$ stage acquires the first update value $X_{m-1}$ calculated by the (m−1) tri FY addition unit 54-($m$−1) in the immediately preceding clock cycle and holds the acquired first update value $X_{m-1}$ for one clock cycle period. For each clock cycle, the Y transfer register 56-($2m$−1) on the $(2m-1)^{th}$ stage acquires the second update value $Y_{m-1}$ held by the Y transfer register 56-($2m$−2) on the $(2m-2)^{th}$ stage in the immediately preceding clock cycle and holds the acquired one second update value $Y_{m-1}$ for one clock cycle period.

For each clock cycle, the $m^{th}$ FX computing unit 51-$m$ calculates a second derivative value by performing the first function operation for the first update value stored in the X transfer register 55-($2m$−1) on the $(2m-1)^{th}$ stage. For each clock cycle, the $m^{th}$ FX addition unit 52-$m$ calculates a new second update value $Y_m$ by adding the second derivative value calculated by the $m^{th}$ FX computing unit 51-$m$ in the clock cycle and the second update value $Y_{m-1}$ stored in the Y transfer register 56-($2m$−1) on the $(2m-1)^{th}$ stage.

For each clock cycle, the X transfer register 55-$2m$ on the $2m^{th}$ stage acquires the first update value $X_{m-1}$ held by the X transfer register 55-($2m$−1) on the $(2m-1)^{th}$ stage in the immediately preceding clock cycle and holds the acquired one first update value $X_{m-1}$ for one clock cycle period. For each clock cycle, the Y transfer register 56-$2m$ on the $2m^{th}$ stage acquires the second update value $Y_m$ calculated by the $m^{th}$ FX addition unit 52-$m$ in the immediately preceding clock cycle and holds the acquired second update value $Y$, for one clock cycle period.

For each clock cycle, the $m^{th}$ FY computing unit 53-$m$ calculates a first derivative value by performing the second function operation for the second update value $Y_m$ stored in the Y transfer register 56-$2m$ on the $2m^{th}$ stage. For each clock cycle, the $m^{th}$ FY addition unit 54-$m$ calculates a new first update value $X_m$ by adding the first derivative value calculated by the $m^{th}$ FY computing unit 53-$m$ in the clock cycle and the first update value $X_{m-1}$ stored in the X transfer register 55-$2m$ on the $2m^{th}$ stage.

For each clock cycle, the X output register 57 acquires the first update value $X_M$ calculated by the $M^{th}$ FY addition unit 54-M in the immediately preceding clock cycle and stores the acquired first update value $X_M$ as one first variable $X_{OUT}$ at the second time point into the first variable memory 40.

For each clock cycle, the Y output register 58 acquires the second update value $Y_M$ stored in the Y transfer register 56-2M on the $2M^{th}$ stage and stores the acquired second update value $Y_M$ as one second variable $Y_{OUT}$ at the second time point into the second variable memory 42.

By performing such pipeline processing, the function computing unit 46 according to the third example can perform computation as described below, for each clock cycle.

$$Y_1 = FX(X_{IN}) + Y_{IN}$$

$$X_1 = FY(Y_1) + X_{IN}$$

...

$$Y_m = FX(X_{m1}) + Y_{m1}$$

$$X_m = FY(Y_m) + X_{m-1}$$

...

$$Y_M = FX(X_{M-1}) + Y_{M-1}$$

$$X_M = FY(Y_M) + X_{M-1}$$

$$Y_{OUT} = Y_M$$

$$X_{OUT} = X_M$$

Such a function computing unit 46 according to the third example can perform a series of computations of first function operation, FX addition, second function operation, and FY addition, M times, for a variable pair including one first variable $X_{IN}$ and one second variable $Y_{IN}$ with the same index i. Further, the function computing unit 46 according to the third example performs pipeline processing and therefore can perform computation for a plurality of variable pairs in parallel. The function computing unit 46 according to the third example thus can complete computation for N variable pairs in a short time.

Figure 8:
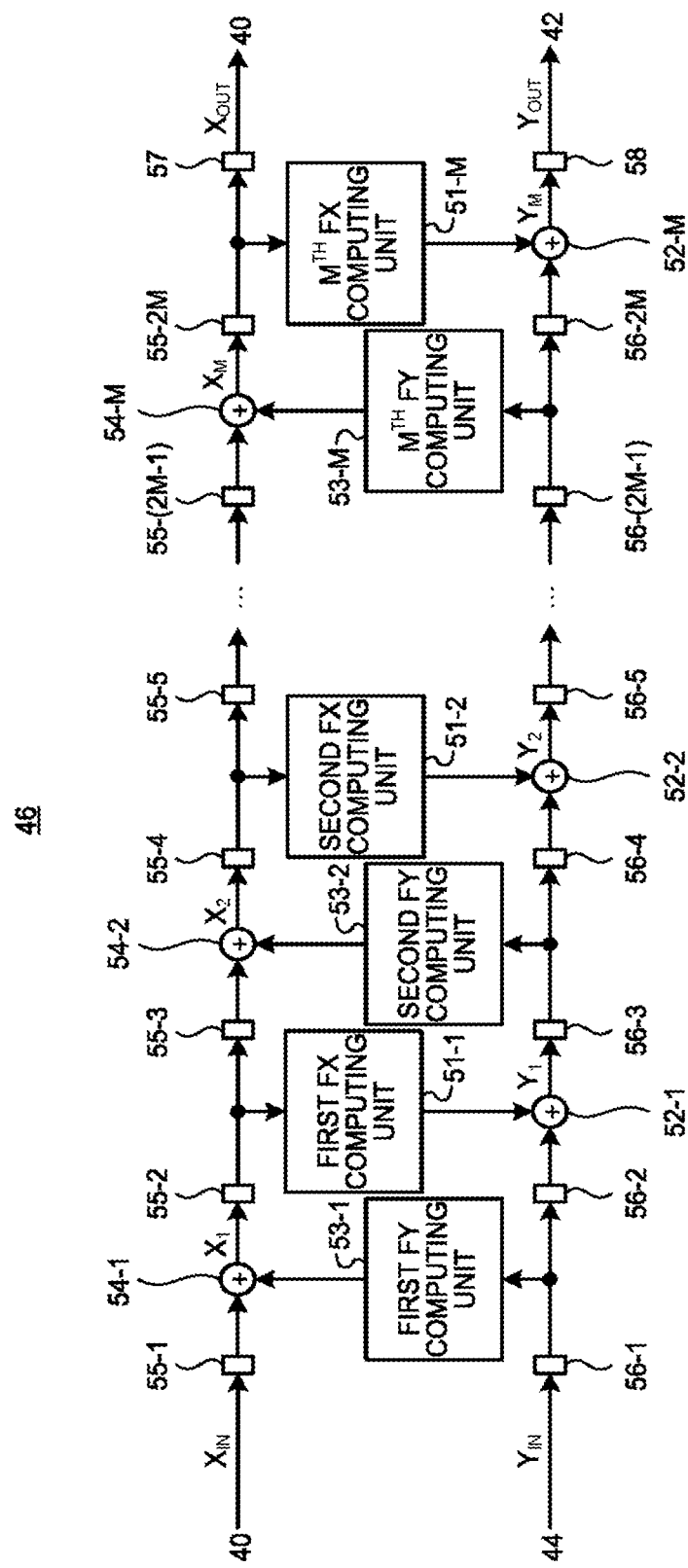
FIG. 8 is a diagram illustrating a fourth example of the configuration of the function computing unit.

FIG. 8 is a diagram illustrating a fourth example of the configuration of the function computing unit 46. The function computing unit 46 may have the configuration of the fourth example as illustrated in FIG. 8. The function computing unit 46 according to the fourth example has substantially the same configuration as the second example. In a description of the fourth example, the components performing the same operation as in the second example are denoted by the same reference signs and will not be further elaborated except for differences.

The $m^{th}$ FY computing unit 53-$m$ (m is any integer from two to M) calculates N first derivative values by performing the second function operation for each of N second update values calculated by the $(m-1)^{th}$ FX addition unit 52-$(m-1)$. The $m^{th}$ FY addition unit 54-$m$ calculates N new first update values by adding N first derivative values calculated by the $m^{th}$ FY computing unit 53-$m$ and N first update values calculated by the $(m-1)^{th}$ FY addition unit 54-$m$.

The $m^{th}$ FX computing unit 51-$m$ calculates N second derivative values by performing the first function operation for each of N first update values calculated by the $m^{th}$ FY addition unit 54-$m$. The $m^{th}$ FX addition unit 52-$m$ calculates N new second update values by adding N second derivative values calculated by the $m^{th}$ FX computing unit 51-$m$ and N second update values calculated by the $(m-1)^{th}$ FX addition unit 52-$(m-1)$.

The function computing unit 46 having such a configuration in the fourth example can perform the loop process from S16 to S19 in the first embodiment, M times, in the order of S18 to S17. The function computing unit 46 thus can time-evolve N first variables and N second variables at the first time point using a method called symplectic Euler method to calculate N first variables and N second variables at the second time point.

Further, the function computing unit 46 according to the fourth example may implement computation by pipeline processing. Also in this case, the function computing unit 46 further includes 2M stages of X transfer registers 55-1 to 55-2M, 2M stages of Y transfer registers 56-1 to 56-2M, one X output register 57, and one Y output register 58. In this configuration, the configuration illustrated in the second example performs the same operation as in the second example, except for the X output register 57 and the Y output register 58.

For each clock cycle, the X transfer register 55-$(2m-1)$ on the $(2m-1)^{th}$ stage acquires the first update value $X_{m-1}$ held by the X transfer register 55-$(2m-2)$ on the $(2m-2)^{th}$ stage in the immediately preceding clock cycle and holds the acquired one first update value $X_{m-1}$ for one clock cycle period. For each clock cycle, the Y transfer register 56-$(2m-1)$ on the $(2m-1)^{th}$ stage acquires the second update value $Y_{m-1}$ calculated by the $(m-1)^{th}$ FX addition unit 52-$(m-1)$ in the immediately preceding clock cycle and holds the acquired second update value $Y_{m-1}$ for one clock cycle period.

For each clock cycle, the $m^{th}$ FY computing unit 53-$m$ calculates a first derivative value by performing the second function operation for the second update value $Y_{m-1}$ stored in the Y transfer register 56-$(2m-1)$ on the $(2m-1)^{th}$ stage. For each clock cycle, the $m^{th}$ FY addition unit 54-$m$ calculates a new first update value $X_m$ by adding the first derivative value calculated by the $m^{th}$ FY computing unit 53-$m$ in the clock cycle and the first update value $X_{m-1}$ stored in the X transfer register 55-$(2m-1)$ on the $(2m-1)^{th}$ stage.

For each clock cycle, the X transfer register 55-$2m$ on the $2m^{th}$ stage acquires the first update value $X_m$ calculated by the $m^{th}$ FY addition unit 54-$m$ in the immediately preceding clock cycle and holds the acquired first update value $X_m$ for one clock cycle period. For each clock cycle, the Y transfer register 56-$2m$ on the $2m^{th}$ stage acquires the second update value $Y_{m-1}$ held by the Y transfer register 56-$(2m-1)$ on the $(2m-1)^{th}$ stage in the immediately preceding clock cycle and holds the acquired one second update value $Y_{m-1}$ for one clock cycle period.

For each clock cycle, the m' FX computing unit 51-$m$ calculates a second derivative value by performing the first function operation for the first update value $X_m$ stored in the X transfer register 55-$2m$ on the $2m^{th}$ stage. For each clock cycle, the $m^{th}$ FX addition unit 52-$m$ calculates a new second update value $Y_m$ by adding the second derivative value calculated by the $m^{th}$ FX computing unit 51-$m$ in the clock cycle and the second update value $Y_{m-1}$ stored in the Y transfer register 56-$2m$ on the $2m^{th}$ stage.

For each clock cycle, the X output register 57 acquires the first update value $X_M$ stored in the X transfer register 55-2M on the $2M^{th}$ stage and stores the acquired first update value $X_M$ as one first variable $X_{OUT}$ at the second time point into the first variable memory 40.

For each clock cycle, the Y output register 58 acquires the second update value $Y_M$ calculated by the $M^{th}$ FX addition unit 52-M in the immediately preceding clock cycle and stores the acquired second update value $Y_M$ as one second variable Your at the second time point into the second variable memory 42.

By performing such pipeline processing, the function computing unit 46 according to the fourth example can perform computation as described below, for each clock cycle.

$$X_1 = FY(Y_{IN}) + X_{IN}$$

$$Y_1 = FX(X_1) + Y_{IN}$$

...

$X_m = FY(Y_{m-1}) + X_{m-1}$ $Y_m = FX(X_m) + Y_{m-1}$

...

$X_M = FY(Y_{M-1}) + X_{M-1}$ $Y_M = FX(X_M) + Y_{M-1}$ $X_{OUT} = X_M$ $Y_{OUT} = Y_M$

Such a function computing unit 46 according to the fourth example can perform a series of computations of second function operation, FY addition, first function operation, and FX addition, M times, for a variable pair including one first variable $X_{IN}$ and one second variable $Y_{IN}$ with the same index i. Further, the function computing unit 46 according to the fourth example performs pipeline processing and therefore can perform computation for a plurality of variable pairs in parallel. The function computing unit 46 according to the fourth example thus can complete computation for N variable pairs in a short time.

Third Embodiment

The calculation apparatus 10 according to a third embodiment will be described.

Figure 9:
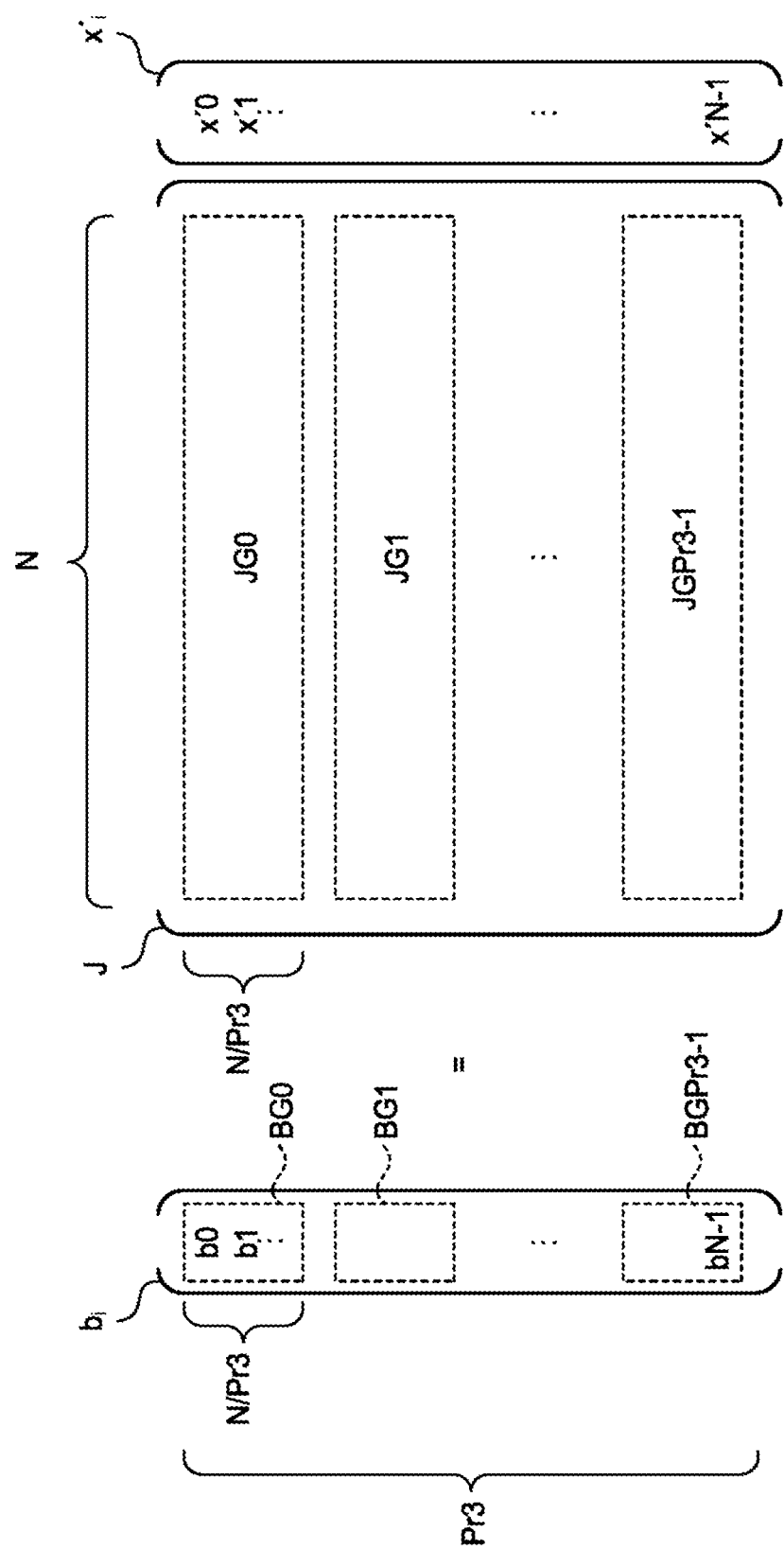
FIG. 9 is a relation diagram of variables and a coefficient matrix in a third embodiment.

FIG. 9 is a diagram illustrating the relation between N first intermediate variables the coefficient matrix J, and N second intermediate variables $b_i$ in the third embodiment.

The coefficient matrix J is divided into $P_{r3}$ block matrices (JG0, JG1, . . . , JGk, . . . , JGPr3−1). Each of $P_{r3}$ block matrices includes coefficients $J_{i,j}$ in (N/$P_{r3}$) rows and N columns. $P_{r3}$ is a divisor of N, and k is any integer from zero to $P_{r3}$−1.

N second intermediate variables $b_1$ are divided into $P_{r3}$ blocks (BG0, BG1, . . . , BGk, . . . , BGPr3−1). Each of $P_{r3}$ blocks further includes (N/$P_{r3}$) second intermediate variables $b_1$. $P_{r3}$ blocks are associated with $P_{r3}$ block matrices in one-to-one correspondence. For example, the kth block BGk corresponds to the kth block matrix JGk.

In the third embodiment, the matrix multiplication unit 28 calculates $P_{r3}$ blocks by separately performing matrix multiplication between N first intermediate variables $x'_i$ and each of $P_{r3}$ block matrices.

Figure 10:
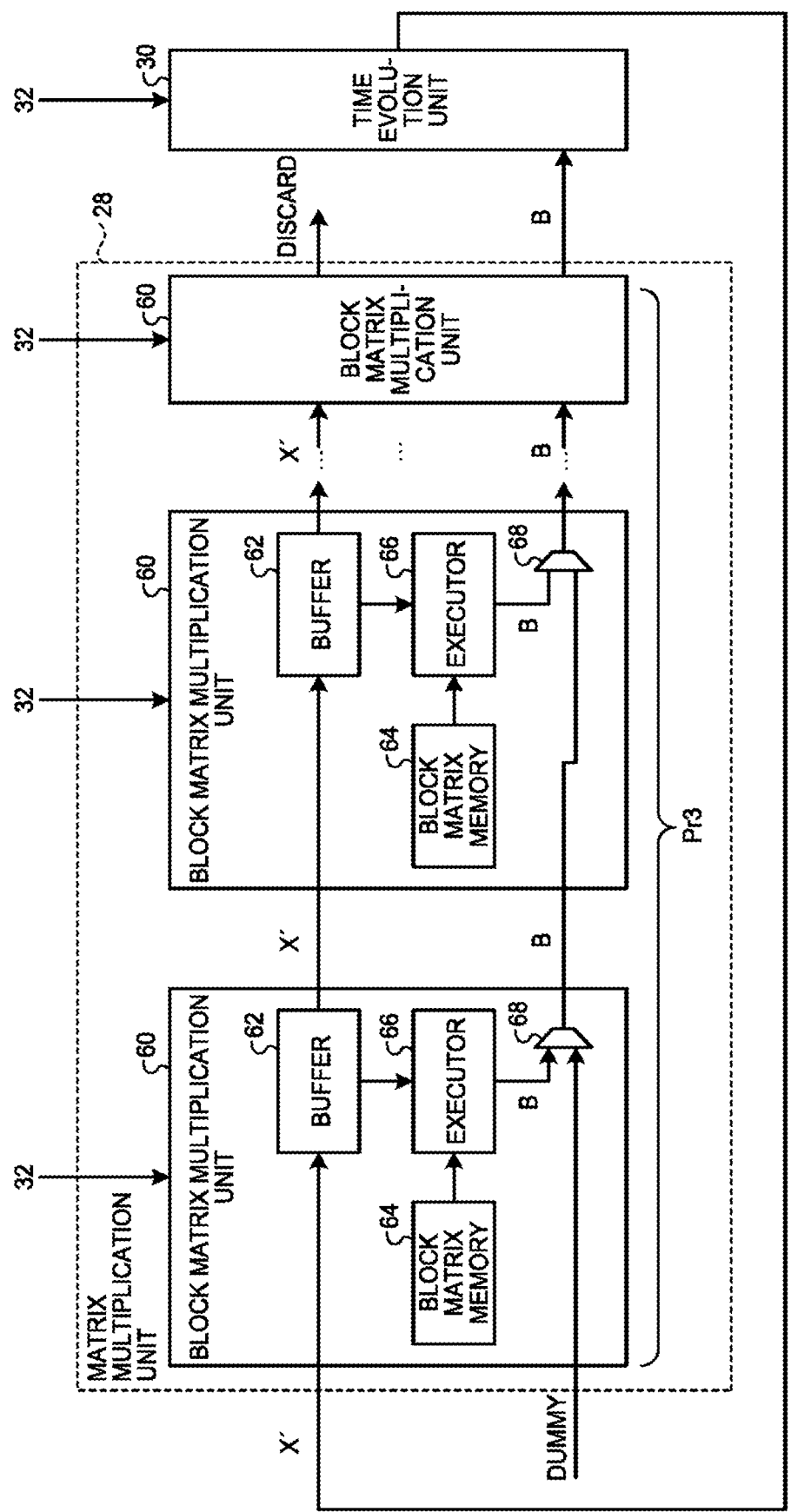
FIG. 10 is a configuration diagram of a matrix multiplication unit according to the third embodiment.

FIG. 10 is a diagram illustrating a configuration of the matrix multiplication unit 28 according to the third embodiment with the time evolution unit 30.

The matrix multiplication unit 28 includes $P_{r3}$ block matrix multiplication units 60 associated with $P_{r3}$ block matrices in one-to-one correspondence. Each of $P_{r3}$ block matrix multiplication units 60 calculates (N/$P_{r3}$) second intermediate variables $b_1$ included in the corresponding block by performing matrix multiplication between N first intermediate variables $x'_i$ and the corresponding block matrix.

$P_{r3}$ block matrix multiplication units 60 have the same configuration. $P_{r3}$ block matrix multiplication units 60 may be, for example, circuits implemented in semiconductor devices different from each other.

Each of $P_{r3}$ block matrix multiplication units 60 receives a first intermediate stream X' which is a stream of N first intermediate variables $x'_i$ and a second intermediate stream B which is a stream of N second intermediate variables $b_1$. Each of $P_{r3}$ block matrix multiplication units 60 transmits the first intermediate stream X' and the second intermediate stream B.

$P_{r3}$ block matrix multiplication units 60 are connected in series. An initial one of the $P_{r3}$ block matrix multiplication unit 60 receives the first intermediate stream X' from the time evolution unit 30. The initial block matrix multiplication unit 60 also receives dummy data as the second intermediate stream B. The dummy data may be transmitted from any block. The block matrix multiplication unit 60 except for the initial one receives the first intermediate stream X' and the second intermediate stream B transmitted from the block matrix multiplication unit 60 on the immediately preceding stage.

The block matrix multiplication unit 60 except for the last transmits the first intermediate stream X' and the second intermediate stream B to the block matrix multiplication unit 60 on the immediately following stage. The last block matrix multiplication unit 60 transmits the second intermediate stream B to the time evolution unit 30. The first intermediate stream X' transmitted from the last block matrix multiplication unit 60 is discarded. The first intermediate stream X' transmitted from the last block matrix multiplication unit 60 may be discarded in the time evolution unit 30 after being received by the time evolution unit 30.

Each of $P_{r3}$ block matrix multiplication units 60 includes a buffer 62, a block matrix memory 64, an executor 66, and a selector 68.

The buffer 62 of the initial block matrix multiplication unit 60 acquires the first intermediate stream X' output from the time evolution unit 30, stores the acquired first intermediate stream X' for a given time, and then outputs the same. The buffer 62 of the block matrix multiplication unit 60 except for the initial one acquires the first intermediate stream X' output from the block matrix multiplication unit 60 on the immediately preceding stage, stores the acquired first intermediate stream X' for a given time, and then outputs the same.

The block matrix memory 64 stores the coefficients Jif in (N/$P_{r3}$) rows and N columns included in the corresponding block matrix. The executor 66 calculates (N/$P_{r3}$) second intermediate variables $b_i$ included in the corresponding block, based on the first intermediate stream X' stored in the buffer 62 and the block matrix stored in the block matrix memory 64.

Here, the executor 66 outputs (N/$P_{r3}$) second intermediate variables $b_i$ included in the corresponding block as a second intermediate stream B including $P_{r1}$ second intermediate variables $b_1$ in one clock cycle. $P_{r1}$ is a divisor of N.

Further, the executor 66 outputs the second intermediate stream B in a clock cycle different from the executor 66 included in another block matrix multiplication unit 60. Therefore, the second intermediate stream B is not output from a plurality of block matrix multiplication units 60 in the same clock cycle.

The selector 68 of the initial block matrix multiplication unit 60 selects and outputs the second intermediate stream B output by the executor 66 of the initial block matrix multiplication unit 60, in a clock cycle in which the executor 66 of the initial block matrix multiplication unit 60 outputs a second intermediate stream B. The selector 68 of the initial block matrix multiplication unit 60 selects and outputs dummy data, in a clock cycle in which the executor 66 of the initial block matrix multiplication unit 60 does not output a second intermediate stream B.

The selector 68 of the kth block matrix multiplication unit 60 excluding the initial block matrix multiplication unit selects and outputs the second intermediate stream B output by the executor 66 of the kth block matrix multiplication unit 60, in a clock cycle in which the executor 66 of the kth block matrix multiplication unit 60 outputs a second intermediate stream B. In a clock cycle in which the executor 66 of the kth block matrix multiplication unit 60 does not output a second intermediate stream B, the second intermediate stream B output by the selector 68 of the block matrix multiplication unit 60 on the preceding stage is selected and output.

Figure 11:
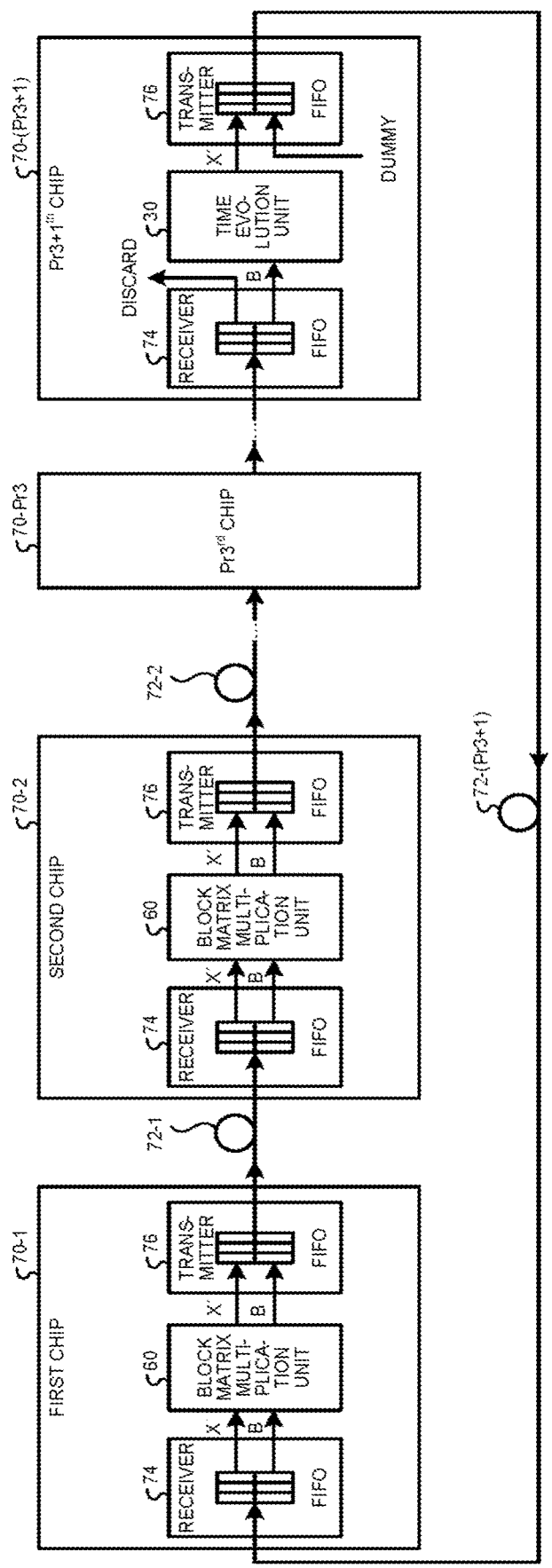
FIG. 11 is a diagram illustrating an implementation example according to the third embodiment.

FIG. 11 is a diagram illustrating an implementation example of the matrix multiplication units 28 and the time evolution unit 30 according to the third embodiment.

$P_{r3}$ matrix multiplication units 28 and the time evolution unit 30 according to the third embodiment can be implemented, for example, on ($P_{r3}$+1) chips 70-1 to 70-($P_{r3}$+1) which are individually independent semiconductor chips.

Each of the first to $P_{r3}^{rd}$ chips 70-1 to 70-$P_{r3}$ includes a block matrix multiplication unit 60. The ($P_{r3}$+1)$^{th}$ chip 70-($P_{r3}$+1) includes the time evolution unit 30.

Each chip 70 includes a receiver 74 and a transmitter 76. The receiver 74 is a link port for receiving data. The transmitter 76 is a link port for transmitting data. The receiver 74 and the transmitter 76 may be a transmitter/receiver that performs full-duplex communication. Each chip 70 may include an additional communication port. For example, each chip 70 may include two independent receiving link ports and two independent transmitting link ports.

The transmitter 76 combines the first intermediate variable x'$_i$ and the second intermediate variable b$_i$ in one clock cycle and outputs a combined stream. When the bit width of the first intermediate stream X' is Wx' and the bit width of the second intermediate stream B is Wb, the combined stream has a bit width equal to or greater than Wx'+Wb.

Each of the receiver 74 and the transmitter 76 includes, for example, a FIFO memory. The transmitter 76 combines the first intermediate stream X' and the second intermediate stream B and writes the combined stream into the FIFO. The transmitter 76 then successively transmits the combined stream stored in the FIFO. The receiver 74 writes the received combined stream into the FIFO. The receiver 74 then reads the combined stream in order from the FIFO and separates it into the first intermediate stream X' and the second intermediate stream B.

Two chips 70 are connected through a communication link 72. The output terminal of the first chip 70-1 is connected to the input terminal of the second chip 70-2 through the first communication link 72-1. The output terminal of the k$^{th}$ chip 70-k is connected to the input terminal of the (k+1)$^{th}$ chip 70-(k+1)$^{th}$ rough the kth communication link 72-k. Then, the output terminal of the ($P_{r3}$+1)$^{th}$ chip 70-($P_{r3}$+1) is connected to the input terminal of the first chip 70-1 through the ($P_{r3}$+1)$^{th}$ communication link 72-($P_{r3}$+1). In this way, ($P_{r3}$+1) chips 70-1 to 70-($P_{r3}$+1) are mutually connected in the form of ring topology.

For example, the input terminal and the output terminal of the chip 70 may be quad small form-factor pluggable (QSFP) ports. The communication link 72 may be a QSFP-adapted optical cable or a QSFP-adapted metal cable. The communication link 72 between two chips 70 may be a high-speed serial link, an Ethernet link, or a peer-to-peer link.

In the present embodiment, each chip 70 transmits/receives a combined stream. However, the first intermediate stream X' and the second intermediate stream B may be each individually transmitted/received. In this case, ($P_{r3}$+1) chips 70-1 to 70-($P_{r3}$+1) are mutually connected in the form of two-ring topology.

Such a calculation apparatus 10 according to the third embodiment can cope with change in number of first variables $x_i$ to be determined by an optimization problem, by changing the number of block matrix multiplication units 60. Therefore, when the number of first variables $x_i$ to be determined by an optimization problem significantly increases, the calculation apparatus 10 can cope, for example, by increasing the number of chips 70 having the same configuration. In addition, the calculation apparatus can complete the optimization problem in a short time because a plurality of block matrix multiplication units 60 perform matrix operations in parallel.

Fourth Embodiment

The calculation apparatus 10 according to a fourth embodiment will be described.

Figure 12:
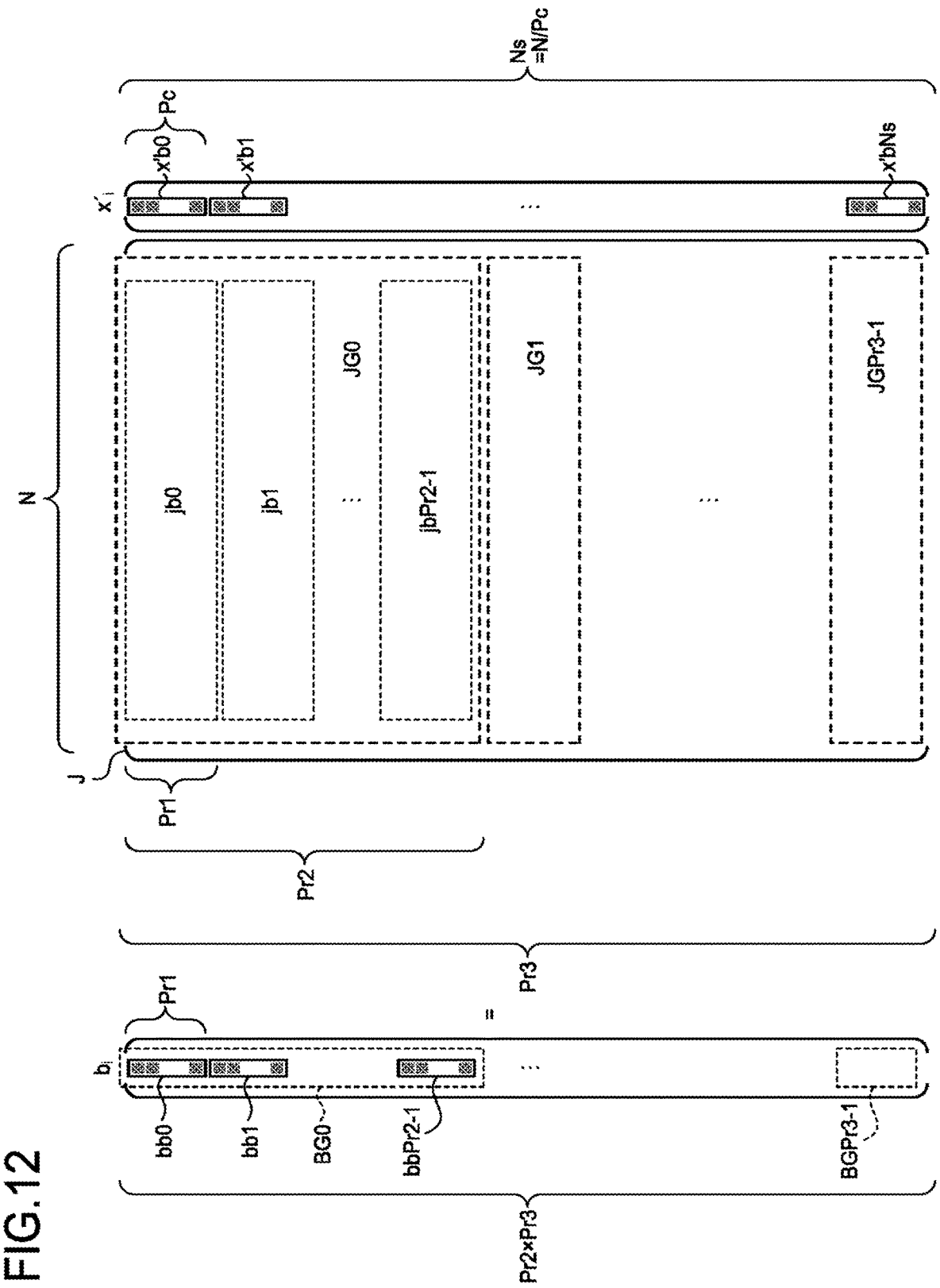
FIG. 12 is a relation diagram of variables and a coefficient matrix in a fourth embodiment.

FIG. 12 is a diagram illustrating the relation between N first intermediate variables x'$_i$, the coefficient matrix J, and N second intermediate variables b$_i$ in the fourth embodiment. In the fourth embodiment, N first intermediate variables x'$_i$, the coefficient matrix J, and N second intermediate variables b$_i$ have the relation as illustrated in FIG. 12, in addition to the similar relation as in the third embodiment.

N first intermediate variables x'$_i$ are divided into $N_s$ data sets. Each of $N_s$ data sets includes $P_c$ first intermediate variables x'$_i$. $N_s$ and $P_c$ are divisors of N. For example, N first intermediate variables x'$_i$ are divided into $N_G$ data sets x'b0, x'b1, . . . , and x'bNs.

Each of $P_{r3}$ block matrices is divided into $P_{r2}$ submatrices. Each of $P_{r2}$ submatrices includes coefficients $J_{i,j}$ in $P_{r3}$ rows and N columns. For example, the block matrix JG0 is divided into $P_{r2}$ submatrices jb0, jb1, . . . , jbs, . . . , and jbPr2-1.

$P_{r1}$ and $P_{r2}$ are divisors of N, and $P_{r1} \times P_{r2} \times P_{r3}$ are N. Here, s is any integer from zero to $P_{r2}$-1.

Each of $P_{r3}$ blocks included in N second intermediate variables b$_i$ is divided into $P_{r2}$ sub-blocks. Each of Pre sub-blocks includes $P_{r1}$ second intermediate variables b$_i$. For example, the block BG0 is divided into $P_{r2}$ sub-blocks bb0, bb1, . . . , bbs, . . . , and bbPr2-1.

$P_{r2}$ sub-blocks included in the k$^{th}$ block are associated with $P_{r2}$ submatrices included in the k$^{th}$ block matrix in one-to-one correspondence. For example, the s$^{th}$ sub-block included in the kth block BGk corresponds to the s$^{th}$ submatrix jbs included in the k$^{th}$ block matrix JGk.

In the fourth embodiment, the block matrix multiplication unit 60 performs matrix multiplication between N first intermediate variables x'$_i$ for each submatrix included in the corresponding block matrix. For example, the kth block matrix multiplication unit 60 calculates $P_{r2}$ sub-blocks included in the kth block BGk by individually performing matrix multiplication between N first intermediate variables x'$_i$ and each of $P_{r2}$ submatrices included in the k$^{th}$ block matrix JGk.

Figure 13:
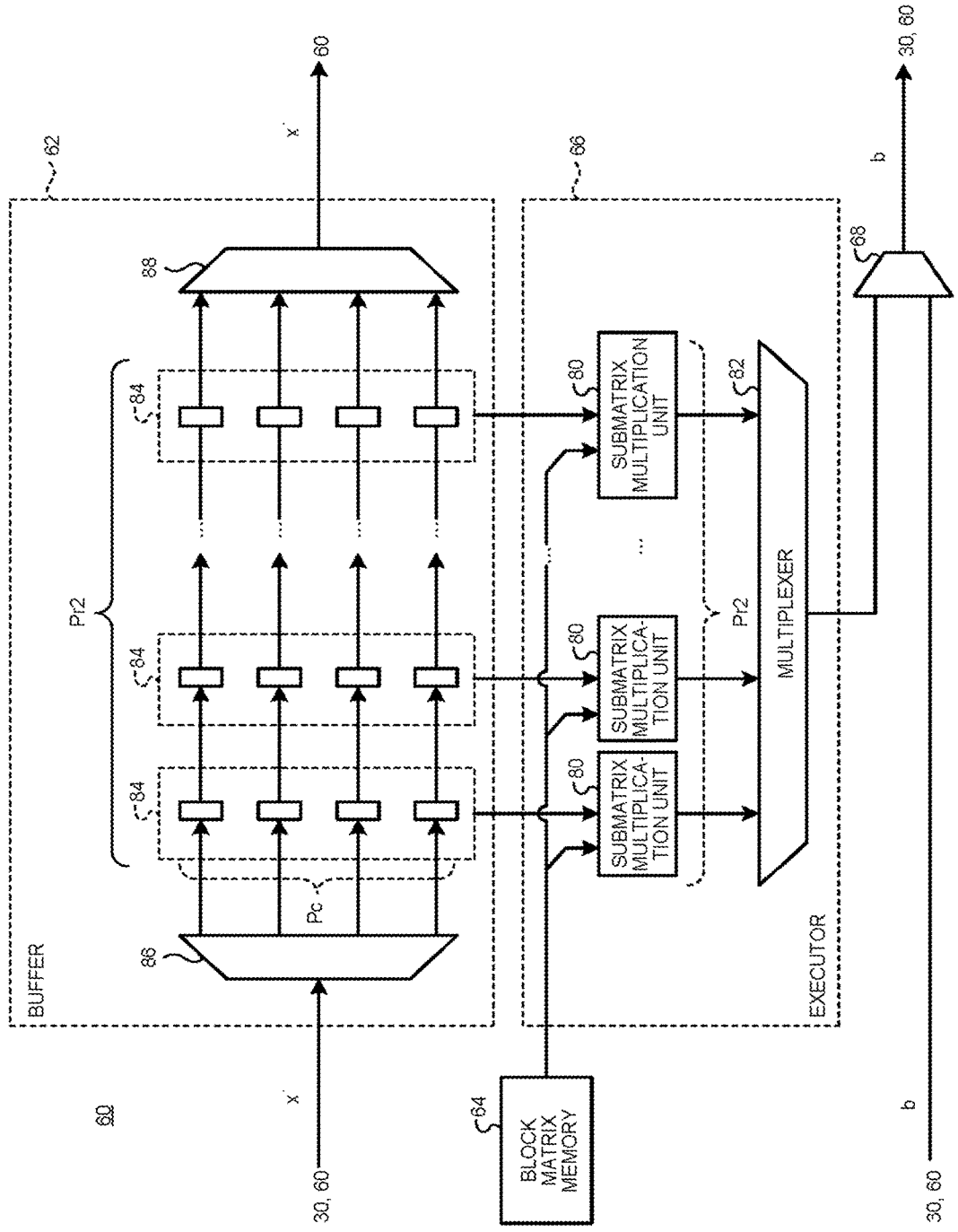
FIG. 13 is a configuration diagram of a block matrix multiplication unit according to the fourth embodiment.

FIG. 13 is a diagram illustrating a configuration of the block matrix multiplication unit 60 according to the fourth embodiment. The executor 66 included in the block matrix multiplication unit 60 includes $P_{r2}$ submatrix multiplication units 80 and a multiplexer 82.

$P_{r2}$ submatrix multiplication units 80 are associated with $P_{r2}$ submatrices included in the corresponding block matrix in one-to-one correspondence. For example, $P_{r2}$ submatrix multiplication units 80 included in the block matrix multiplication unit 60 associated with the kth block matrix are associated with $P_{r2}$ submatrices included in the kth block matrix in one-to-one correspondence.

Each of $P_{r2}$ submatrix multiplication units 80 included in the kth block matrix multiplication unit 60 calculates $P_{r1}$ second intermediate variables $b_i$ included in the corresponding sub-block by performing matrix multiplication between N first intermediate variables $x'_i$ and the corresponding submatrix.

Each of $P_{r2}$ submatrix multiplication units 80 outputs $P_{r1}$ second intermediate variables $b_i$ included in the corresponding sub-block in parallel in one clock cycle. For example, the $s^{th}$ submatrix multiplication unit 80 included in the $k^{th}$ block matrix multiplication unit 60 outputs $P_{r1}$ second intermediate variables $b_i$ included in the $s^{th}$ sub-block included in the $k^{th}$ block in the same clock cycle.

Further, each of $P_{r2}$ submatrix multiplication units 80 outputs $P_{r1}$ second intermediate variables $b_i$ in a clock cycle different from other submatrix multiplication units 80. That is, the second intermediate variable $b_i$ is not output from a plurality of submatrix multiplication units 80 in the same clock cycle.

The multiplexer 82 generates a second intermediate stream B including $P_{r1}$ second intermediate variables $b_i$ in one clock cycle by multiplexing a set of $P_{r2}$ second intermediate variables $b_i$ output from each of $P_{r2}$ submatrix multiplication units 80. For example, the multiplexer 82 included in the $k^{th}$ block matrix multiplication unit 60 outputs a second intermediate stream B including $P_{r2}$ sub-blocks included in the $k^{th}$ block in $P_{r2}$ clock cycles.

The buffer 62 included in the block matrix multiplication unit 60 includes $P_{r2}$ stages of registers 84 functioning as a shift register, an in-buffer receiver 86, and an in-buffer transmitter 88.

$P_{r2}$ stages of registers 84 are associated with $P_{r2}$ submatrix multiplication units 80 in one-to-one correspondence. Each of $P_{r2}$ stages of registers 84 stores a data set including $P_c$ first intermediate variables x'1 in one clock cycle. Each of $P_{r2}$ stages of registers 84 transfers the stored data set including $P_c$ first intermediate variables $x'_i$ to the register 84 on the next stage in parallel in the next clock cycle.

The in-buffer receiver 86 receives a first intermediate stream X' and converts the received first intermediate stream X' into a stream with a word width of $P_c$. The in-buffer receiver 86 then writes a data set including $P_c$ first intermediate variables $x'_i$ into an initial register 84 for each clock cycle.

The in-buffer transmitter 88 reads a data set including $P_c$ first intermediate variables $x'_i$ from the register 84 on the last stage for each clock cycle and converts the read data set into a first intermediate stream X'. The in-buffer transmitter 88 then transmits the first intermediate stream X'.

Each of $P_{r2}$ submatrix multiplication units 80 reads a data set including $P_c$ first intermediate variables $x'_i$ stored in the corresponding register 84, for each clock cycle. Each of $P_{r2}$ submatrix multiplication units 80 multiplies each of the read $P_c$ first intermediate variables $x'_i$ and the coefficient $J_{i,j}$ in the corresponding column in the corresponding submatrix, for each clock cycle. Each of $P_{r2}$ submatrix multiplication units 80 then cumulatively adds the multiplication result of the first intermediate variable $x'_i$ and the coefficient $J_{i,j}$, for each row included in the corresponding submatrix. Each of $P_{r2}$ submatrix multiplication units 80 thus can calculate $P_{r1}$ second intermediate variables $b_i$ included in the corresponding sub-block.

Here, each of $P_{r2}$ submatrix multiplication units 80 performs multiplication and cumulative addition in a period before an initial first intermediate variable $x'_0$ to the last first intermediate variable $x'_{N-1}$ of N first intermediate variables $x'_i$ are stored into the corresponding register 84. Each of $P_{r2}$ submatrix multiplication units 80 then outputs $P_{r1}$ second intermediate variables $b_i$ included in the corresponding sub-block after passage of a predetermined number of clock cycles after the clock cycle in which the last first intermediate variable $x'_{N1}$ is stored into the corresponding register 84. Then, each of $P_{r2}$ submatrix multiplication units 80 can output $P_{r1}$ second intermediate variables $b_i$ included in the corresponding sub-block in clock cycles different from each other.

The calculation apparatus 10 according to the fourth embodiment having such a configuration can perform matrix multiplication with the degree of parallelism $P_{r3} \times P_{r2}$. The calculation apparatus 10 according to the fourth embodiment thus can perform matrix multiplication at high speed.

Fifth Embodiment

The calculation apparatus 10 according to a fifth embodiment will be described.

Figure 14:
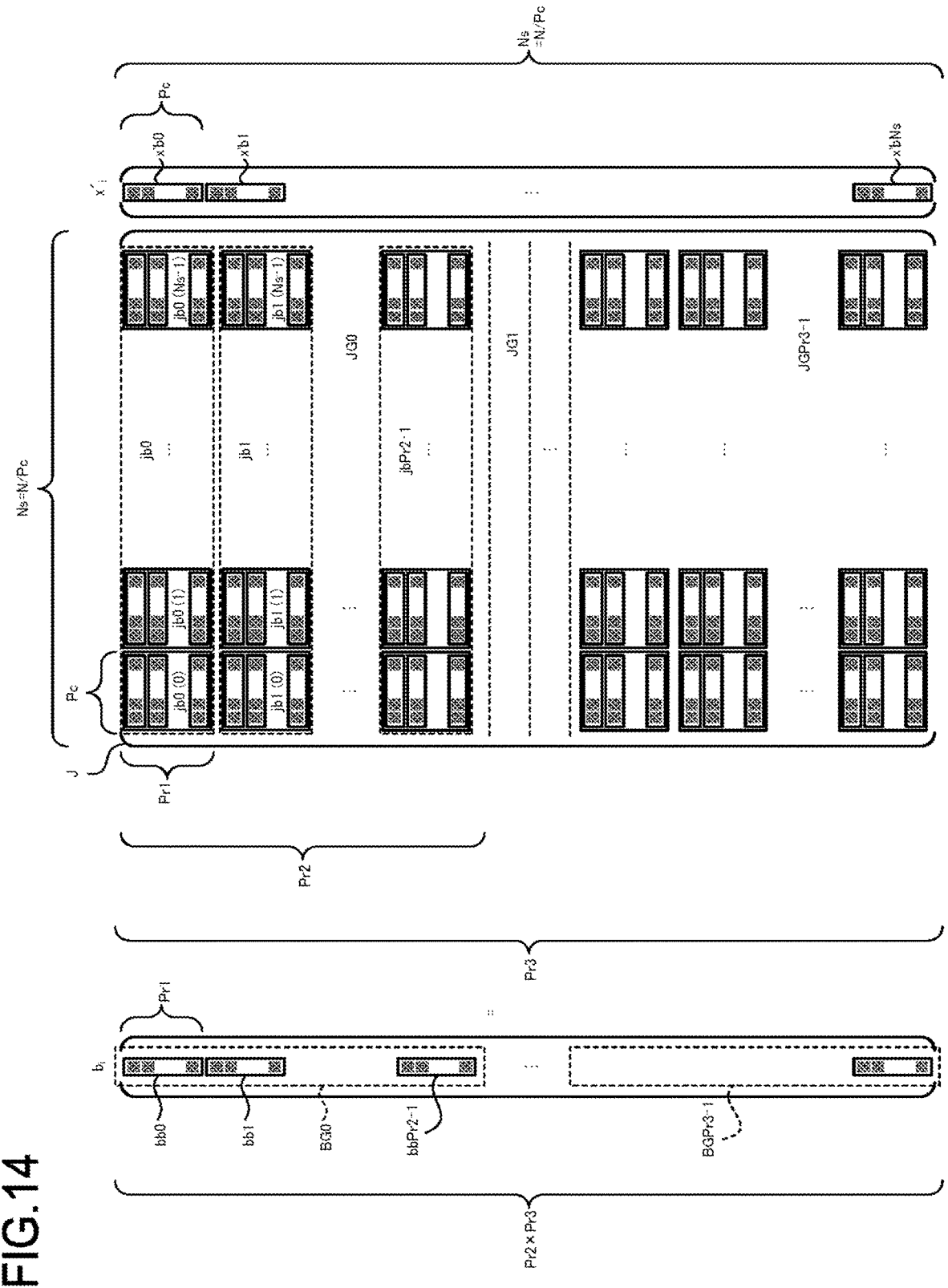
FIG. 14 is a relation diagram of variables and a coefficient matrix in a fifth embodiment.

FIG. 14 is a diagram illustrating the relation between N first intermediate variables $x'_i$, the coefficient matrix J, and N second intermediate variables $b_i$ in the fifth embodiment. In the fifth embodiment, N first intermediate variables $x'_i$, the coefficient matrix J, and N second intermediate variables $b_i$ further have the relation as illustrated in FIG. 14, in addition to the similar relation as in the fourth embodiment.

Each of $P_{r3}$ block matrices is divided into $P_{r2}$ submatrices. Each of $P_{r2}$ submatrices is further divided into $N_s$ coefficient sets, in units of $P_c$ columns. Each coefficient set includes a coefficient $J_{i,j}$ with $P_{r1}$ rows and $P_c$ columns. For example, the submatrix jb0 included in the block matrix JG0 is divided into $N_s$ coefficient sets of jb0(0), jb0(1), . . . , and jb0($N_s$−1).

$N_s$ coefficient sets have one-to-one correspondence with $N_c$ data sets obtained by dividing N first intermediate variables $x'_i$ in units of $P_c$.

In the fifth embodiment, the submatrix multiplication unit 80 calculates a multiply-accumulate value of $P_c$ coefficients $J_{i,j}$ and the corresponding $P_c$ first intermediate variables $x'_i$, for each of $P_{r1}$ rows included in one coefficient set. The submatrix multiplication unit 80 then adds all of the multiply-accumulate values calculated for each of $N_s$ coefficient sets, for each of $P_{r1}$ rows. The submatrix multiplication unit 80 thus can multiply-accumulate N coefficients $J_{i,j}$ and N first intermediate variables $x'_i$, for each of $P_{r1}$ rows.

Figure 15:
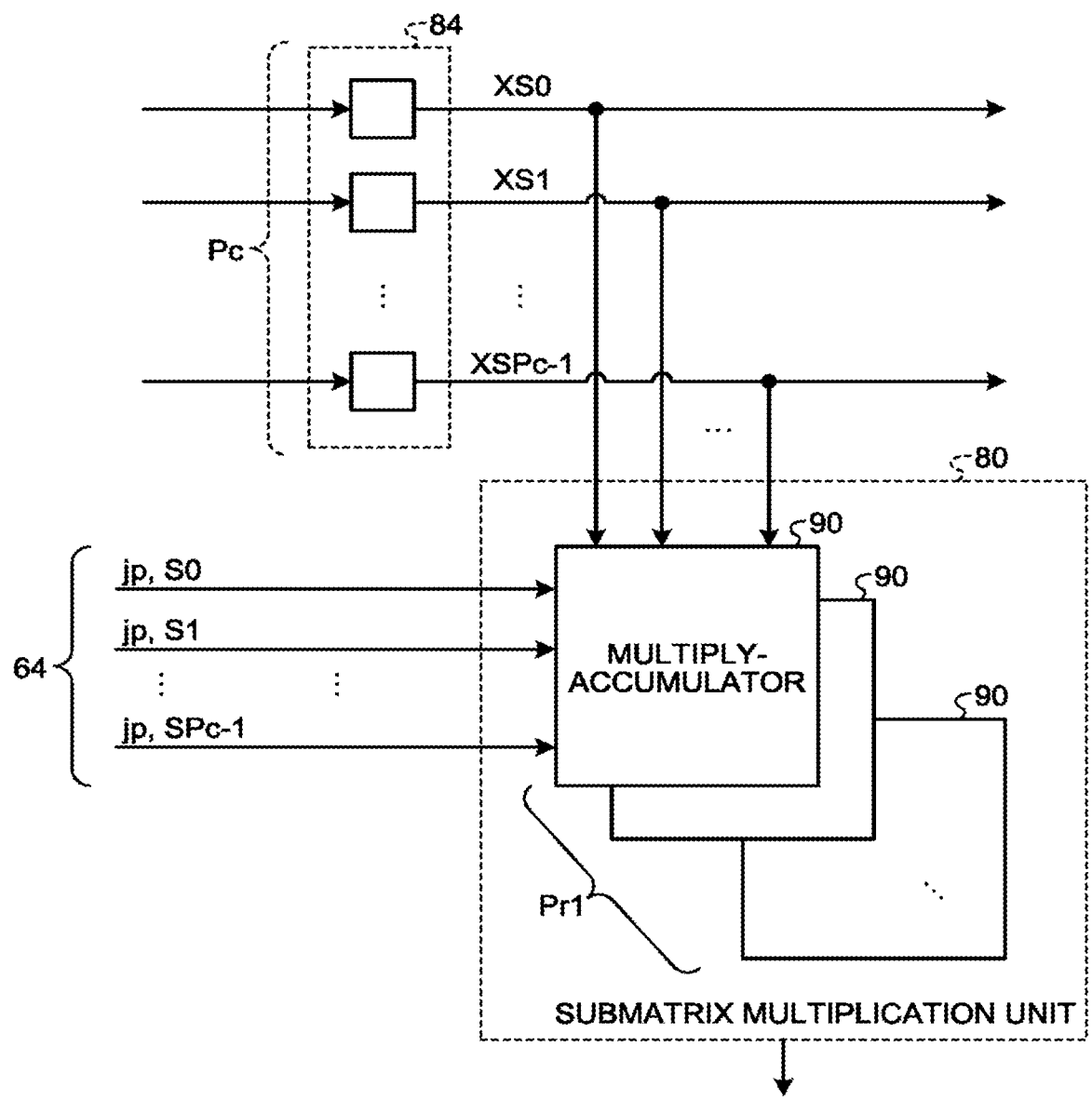
FIG. 15 is a configuration diagram of a submatrix multiplication unit according to the fifth embodiment.

FIG. 15 is a diagram illustrating a configuration of the submatrix multiplication unit 80 according to the fifth embodiment with the corresponding register 84. Each submatrix multiplication unit 80 includes $P_{r1}$ multiply-accumulators 90.

$P_{r1}$ multiply-accumulators 90 are associated with $P_{r1}$ rows included in the corresponding submatrix in one-to-one correspondence. For example, $P_{r1}$ multiply-accumulators 90 associated with the $s^{th}$ submatrix included in the block matrix multiplication unit 60 associated with the $k^{th}$ block matrix are associated with $P_{r1}$ rows included in the $s^{th}$ submatrix included in the $k^{th}$ block matrix in one-to-one correspondence.

$P_{r1}$ multiply-accumulators 90 all have the same configuration. Each of $P_{r1}$ multiply-accumulators 90 calculates a second intermediate variable $b_i$ at a corresponding position included in the corresponding sub-block by multiply-accumulating the corresponding row in the coefficient matrix J and N first intermediate variables $x'_i$. $P_{r1}$ multiply-accumulators 90 calculate second intermediate variables $b_i$ in parallel and output the same in the same clock cycle.

More specifically, for each clock cycle, each of $P_{r1}$ multiply-accumulators 90 acquires an initial first intermediate variable $x'_0$ to the last N first intermediate variables $x'_{N-1}$ of a first intermediate stream X', successively stored in the corresponding register 84 of $P_{r2}$ stages of registers 84. In this case, each of $P_{r1}$ multiply-accumulators 90 acquires a data set including $P_c$ first intermediate variables $x'_i$ in one clock cycle. Then, each of $P_{r1}$ multiply-accumulators 90 performs acquisition of a data set over $N_s$ ($N_s=N/P_c$) clock cycles to acquire $N_s$ data sets. The $p^{th}$ (p is any integer from zero to $P_{r1}-1$) multiply-accumulator 90 of $P_{r1}$ multiply-accumulators 90 acquires $P_c$ coefficients ((jp, S0) to (jp, SPc-1)) included in the $p^{th}$ corresponding row included in a coefficient set corresponding to the acquired data set, in one clock cycle. Each of $P_{r1}$ multiply-accumulators 90 then acquires $P_c$ coefficients included in the coefficient set over $N_s$ clock cycles. Each of $P_{r1}$ multiply-accumulators 90 multiply-accumulates $P_c$ first intermediate variables $x'_i$ and the corresponding $P_c$ coefficients $J_{i,j}$ included in the corresponding row, for each clock cycle. Each of $P_{r1}$ multiply-accumulators 90 calculates a second intermediate variable $b_i$ by cumulatively adding the multiply-accumulate results over $N_s$ clock cycles.

Figure 16:
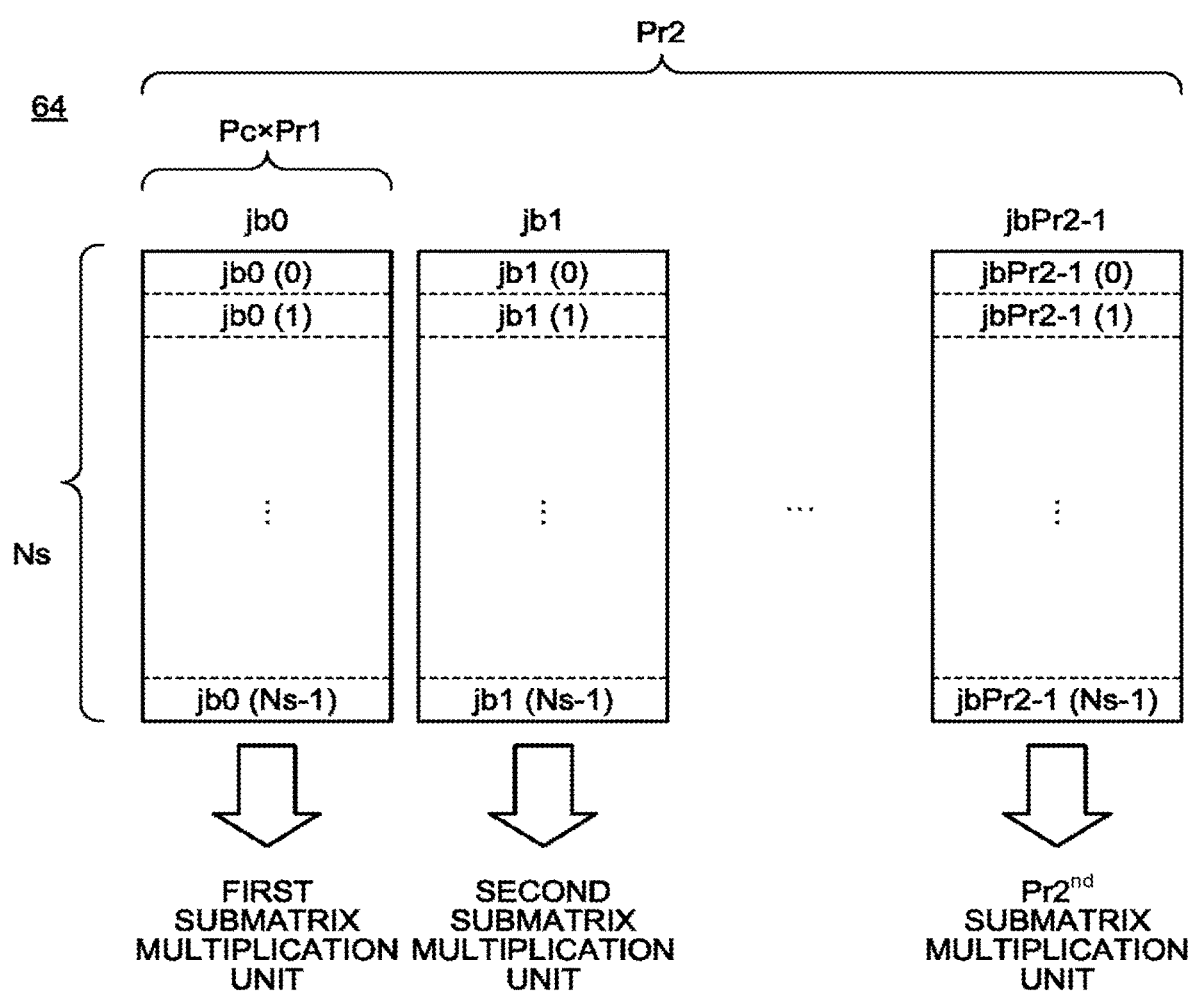
FIG. 16 is a diagram illustrating a block matrix stored in a block matrix memory.

FIG. 16 is a diagram illustrating a block matrix stored in the block matrix memory 64. The block matrix memory 64 stores a block matrix divided into $P_{r2}$ submatrices. $P_{r2}$ submatrices are output in parallel to the corresponding submatrix multiplication units 80.

Each of $P_{r2}$ submatrices includes $N_s$ coefficient sets. Each of $N_s$ coefficient sets includes $P_c \times P_{r1}$ coefficients. The block matrix memory 64 can output $P_c \times P_{r1}$ coefficients included in one coefficient set in parallel in one clock cycle, for each of $P_{r2}$ submatrices.

Figure 17:
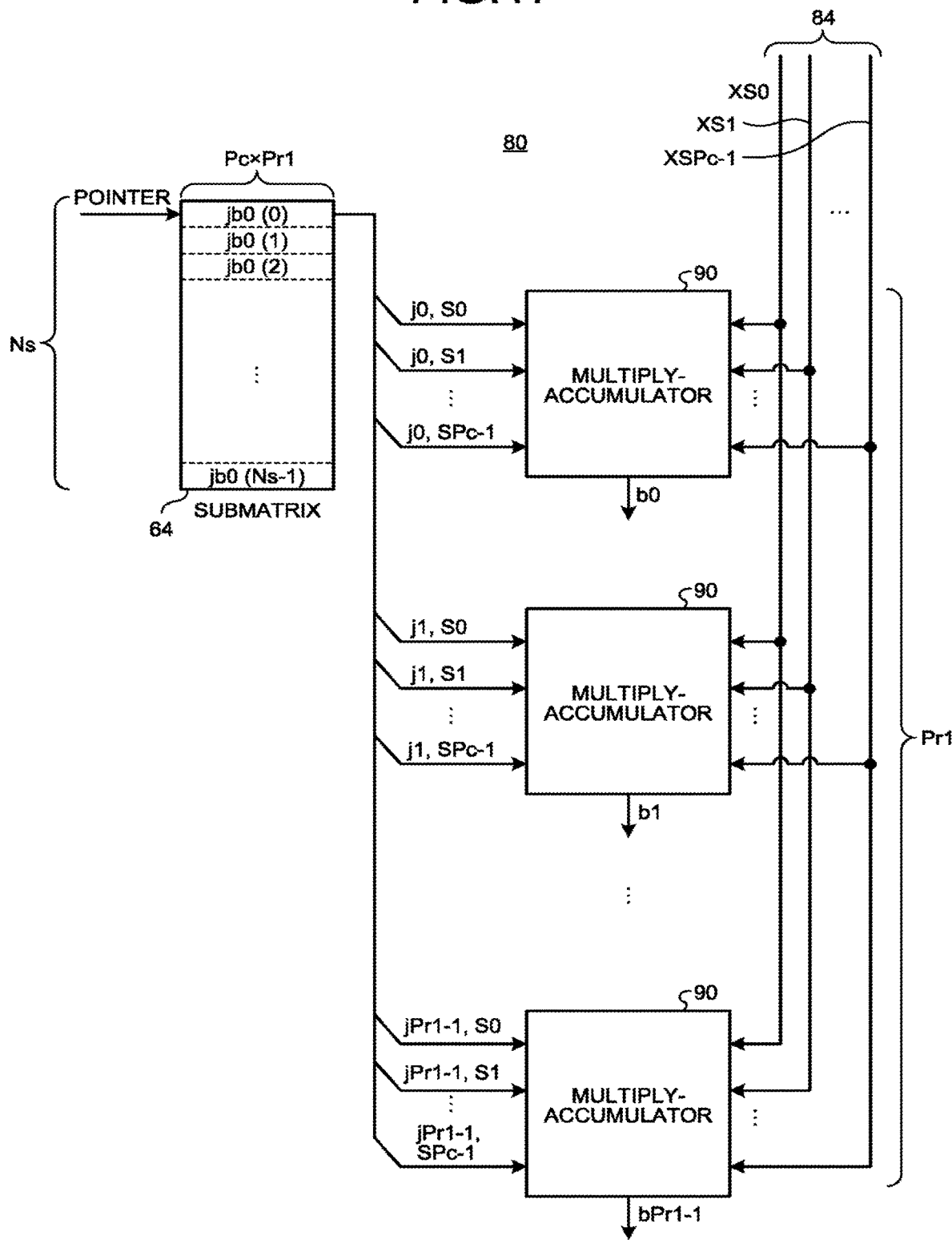
FIG. 17 is a diagram illustrating a submatrix transmitted to a multiply-accumulator.

FIG. 17 is a diagram illustrating $P_{r1}$ multiply-accumulators 90 included in one submatrix multiplication unit 80 and a submatrix transmitted to the submatrix multiplication unit 80.

To each of $P_{r1}$ multiply-accumulators 90 included in one submatrix multiplication unit 80, a data set including $P_c$ first intermediate variables $x'_i$ stored in the corresponding register 84 is broadcasted for each clock cycle.

The block matrix memory 64 includes $N_s$ coefficient sets for each submatrix. In the block matrix memory 64, one coefficient set included in each submatrix is specified by a pointer for each clock cycle. More specifically, in the block matrix memory 64, a coefficient set corresponding to the data set stored in the register 84 corresponding to the submatrix is specified.

The block matrix memory 64 outputs $P_c \times P_{r1}$ coefficients included in the coefficient set specified by a pointer in parallel, for each clock cycle. For each of $P_c \times P_{r1}$ coefficients included in a coefficient set, its output destination multiply-accumulator 90 is determined in advance. The block matrix memory 64 outputs each of $P_c \times P_{r1}$ coefficients included in one coefficient set to a predetermined multiply-accumulator 90. For example, an initial to the $P_c^{th}$ $P_c$ coefficients in a coefficient set are output to the first multiply-accumulator 90. For example, the $(P_c+1)^{th}$ to $(2 \times P_c)^{th}$ $P_c$ coefficients are output to the second multiply-accumulator 90. The $(P_{r1}-P_c)^{th}$ to $P_{r1}^{st}$ $P_c$ coefficients are output to the $P_{r1}^{st}$ multiply-accumulator 90.

Figure 18:
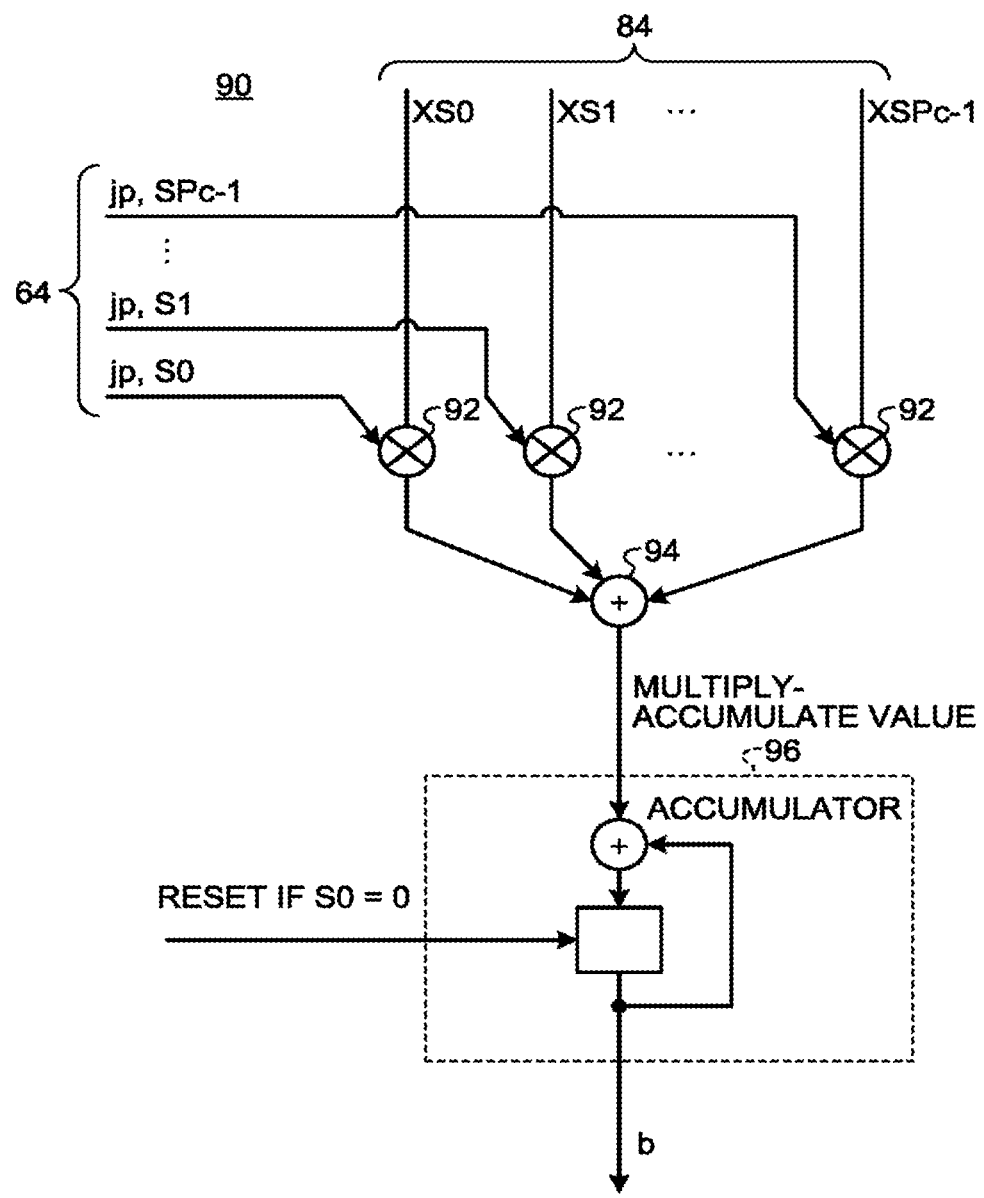
FIG. 18 is a configuration diagram of the multiply-accumulator.

FIG. 18 is a diagram illustrating a configuration of the multiply-accumulator 90. The multiply-accumulator 90 includes $P_c$ multipliers 92, an adder 94, and an accumulator 96. For each clock cycle, the multiply-accumulator 90 acquires a data set including $P_c$ first intermediate variables $x'_i$ and a coefficient set including $P_c$ coefficients $J_{i,j}$.

$P_c$ first intermediate variables $x'_i$ included in a data set have one-to-one correspondence with $P_c$ coefficients $J_{i,j}$ included in a coefficient set. $P_c$ multipliers 92 have one-to-one correspondence with $P_c$ first intermediate variables $x'_i$ included in a data set and $P_c$ coefficients $J_{i,j}$ included in a coefficient set. Each of $P_c$ multipliers 92 multiplies one corresponding first intermediate variable $x'_i$ included in a data set and one corresponding coefficient $J_{i,j}$ included in a coefficient set and outputs a multiplication value. Each of $P_c$ multipliers 92 outputs the multiplication value for each clock cycle.

The adder 94 calculates a multiply-accumulate value by adding $P_c$ multiplication values output from $P_c$ multipliers 92, for each clock cycle. The accumulator 96 cumulatively adds the multiply-accumulate value output from the adder 94, for each clock cycle. The accumulator 96 resets the cumulatively added value to zero at a timing (S0=0) when the initial first intermediate variable $x'_0$ in the first intermediate stream X' is stored in the corresponding register 84.

The multiply-accumulator 90 having such a configuration acquires N first intermediate variables $x'_i$ from the initial first intermediate variable $x'_0$ to the last first intermediate variable of the first intermediate stream X' successively stored in the corresponding register 84 of $P_{r2}$ stages of registers 84, for each clock cycle. Further, the multiply-accumulator 90 multiplies each of the acquired first intermediate variables $x'_i$ and the coefficient $J_{i,j}$ on the column corresponding to the acquired first intermediate variable $x'_i$ that is included in the corresponding row in the coefficient matrix J. The multiply-accumulator 90 then cumulatively adds the multiplication result of the first intermediate variable $x'_i$ and the coefficient $J_{i,j}$ from the initial first intermediate variable $x'_0$ to the last first intermediate variable $x'_{N-1}$ of the first intermediate stream X'. With such processing, the multiply-accumulator 90 can calculate the second intermediate variable $b_i$ at the corresponding position included in the corresponding subblock.

Figure 19:
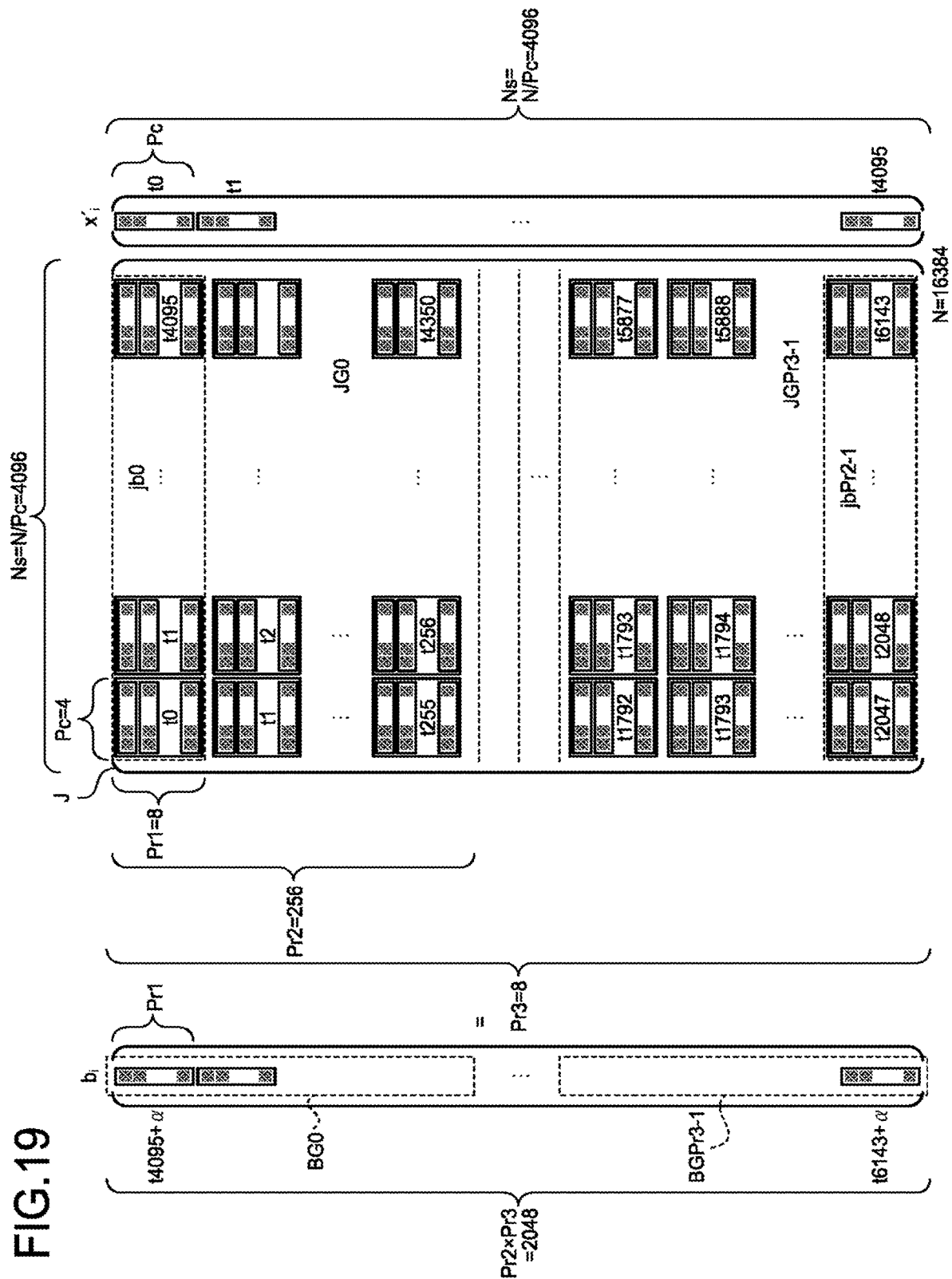
FIG. 19 is a diagram illustrating parameters and timing in the fifth embodiment.

FIG. 19 is a diagram illustrating an example of specific values of parameters and an example of processing timing in the fifth embodiment.

In the example in FIG. 19, N=16384. In the example in FIG. 19, $P_c=4$, $N_s=4096$. In the example in FIG. 19, $P_{r1}=8$, $P_{r2}=256$, $P_{r3}=8$. In FIGS. 19, t0, t1, t2, . . . , and t6143 represent the order of clock cycles.

The initial data set in N first intermediate variables $x'_i$ is stored in the initial register 84 in the initial matrix multiplication unit 28, at t0. Therefore, the initial coefficient set in the submatrix jb0 in the block matrix JG0 is read out at t0.

The last data set in N first intermediate variables $x'_i$ is stored in the initial register 84 in the initial matrix multiplication unit 28, at t4095. Therefore, the last coefficient set in the submatrix jb0 in the block matrix JG0 is read out at t4095.

Then, the initial block in N second intermediate variables $b_i$ can be output after the clock cycle (t4095) in which multiply-accumulation of the last coefficient set in the submatrix jb0 in the block matrix JG0 is completed. Therefore, the initial block in the second intermediate variable $b_i$ is output at t4095+α (α is a predetermined delay time).

The initial data set in N first intermediate variables $x'_i$ is delayed for ($P_{r1} \times P_{r3}=2048$) clock cycles after $t_0$ and thereafter stored in the last register 84 in the last matrix multiplication unit 28. Therefore, the initial coefficient set in the submatrix jbPr2-1 in the block matrix JGPr3-1 is read out at t2047.

The last data set in N first intermediate variables $x'_i$ is delayed for ($P_{r1} \times P_{r3}$=2048) clock cycles after t4095 and thereafter stored in the last register 84 in the last matrix multiplication unit 28. Therefore, the last coefficient set in the submatrix jbPr2-1 in the block matrix JGPr3-1 is read out at t6143.

Then, the last block in N second intermediate variables $b_i$ can be output after the clock cycle (t6143) in which the multiply accumulation of the last coefficient set in the submatrix jbPr2-1 in the block matrix JGPr3-1 is completed. Therefore, the last block in the second intermediate variable $b_i$ is output at t6143+α.

The calculation apparatus 10 according to the fifth embodiment having such a configuration can perform matrix multiplication with the degree of parallelism $P_{r3} \times P_{r2} \times P_{r1}$. The calculation apparatus 10 according to the fifth embodiment thus can perform matrix multiplication at high speed.

Sixth Embodiment

The calculation apparatus 10 according to a sixth embodiment will be described.

Figure 20:
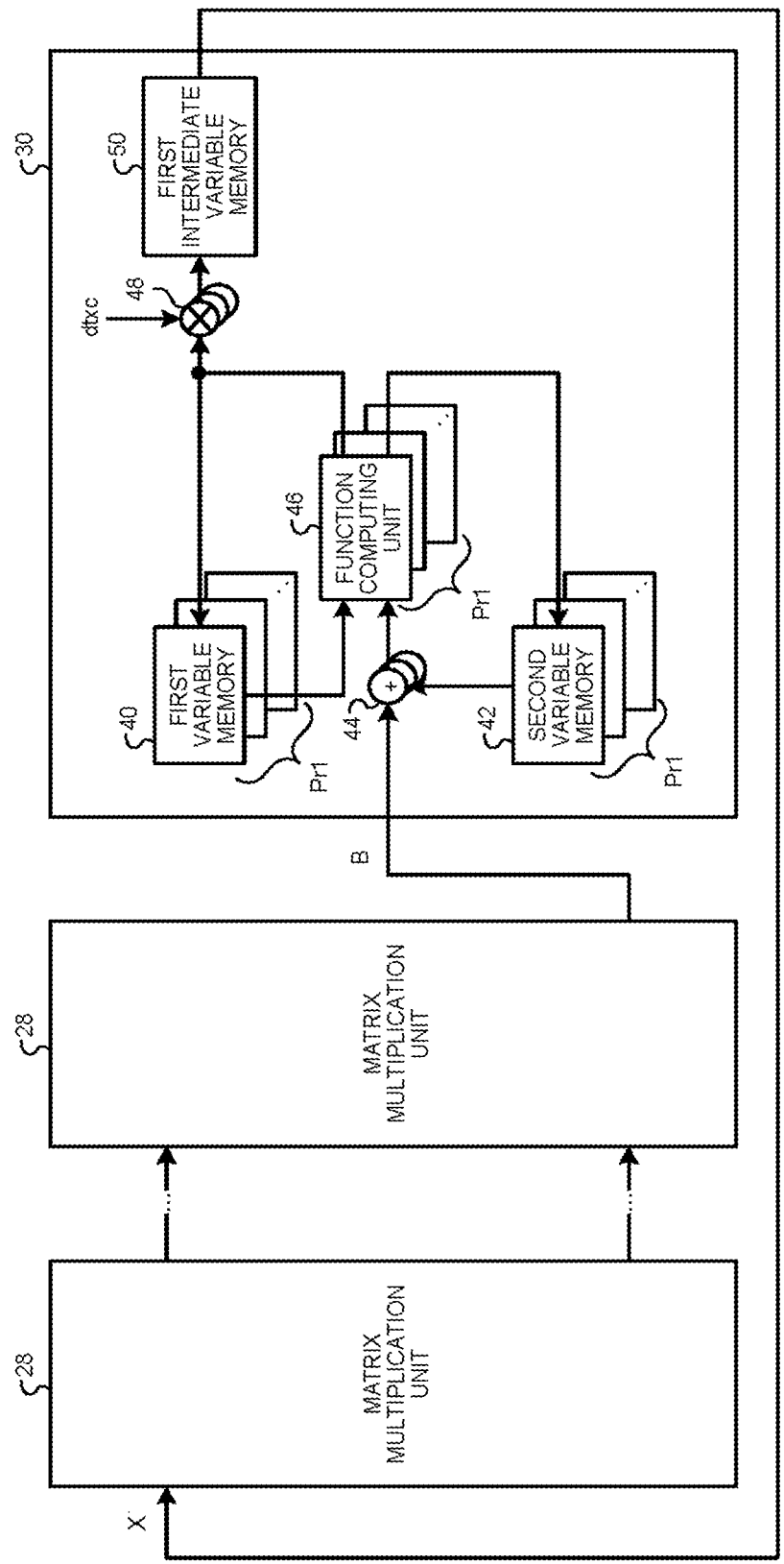
FIG. 20 is a configuration diagram of a time evolution unit according to a sixth embodiment.

FIG. 20 is a diagram illustrating a configuration of the time evolution unit 30 according to the sixth embodiment with a plurality of matrix multiplication units 28. In the sixth embodiment, each matrix multiplication unit 28 outputs a second intermediate stream B including $P_{r1}$ second intermediate variables $b_i$ in one clock cycle. In the sixth embodiment, the time evolution unit 30 receives a second intermediate stream B including $P_{r1}$ second intermediate variables $b_i$ in one clock cycle.

The time evolution unit 30 according to the sixth embodiment includes $P_{r1}$ first variable memories 40, $P_{r1}$ second variable memories 42, $P_{r1}$ first addition units 44, $P_{r1}$ function computing units 46, $P_{r1}$ first multiplication units 48, and one first intermediate variables memory 50.

$P_{r1}$ first variable memories 40, $P_{r1}$ second variable memories 42, $P_{r1}$ first addition units 44, $P_{r1}$ function computing units 46, and $P_{r1}$ first multiplication units 48 have one-to-one correspondence with $P_{r1}$ second intermediate variables $b_i$ included in one clock cycle.

Each of $P_{r1}$ first addition units 44 and each of $P_{r1}$ function computing units 46 perform a computation process for corresponding one second intermediate variable $b_i$ of $P_{r1}$ second intermediate variables $b_i$ included in one clock cycle. Each of $P_{r1}$ first variable memories 40 and each of $P_{r1}$ second variable memories 42 store the first variable $x_i$ and the second variable $y_i$ calculated using corresponding one second intermediate variable $b_i$ of $P_{r1}$ second intermediate variables $b_i$ included in one clock cycle. Each of $P_{r1}$ first multiplication units 48 performs a computation process for the first variable $x_i$ calculated using corresponding one second intermediate variable $b_i$ of $P_{r1}$ second intermediate variables $b_i$ included in one clock cycle.

In this way, the time evolution unit 30 according to the sixth embodiment performs the calculation process of N first variables $x_i$ and N second variables $y_i$ for $P_{r1}$ second intermediate variables $b_i$ included in one clock cycle, with the degree of parallelism $P_{r1}$. The calculation apparatus according to the sixth embodiment thus can perform the calculation process of N first variables $x_i$ and N second variables $y_i$ at high speed.

Figure 21:
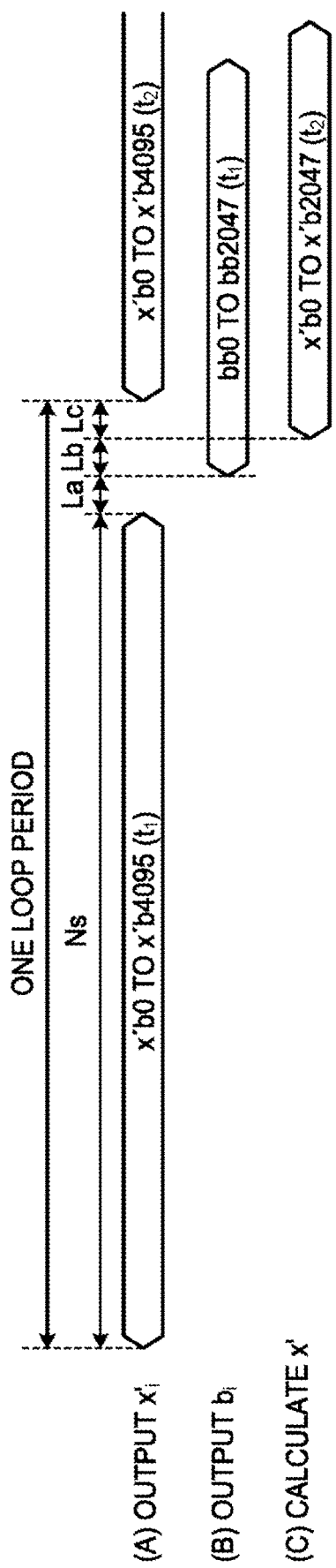
FIG. 21 is a timing chart of a first intermediate variable and a second intermediate variable.

FIG. 21 is a diagram illustrating the output timing of the first intermediate variable $x'_i$ and the second intermediate variable $b_i$. More specifically, (A) in FIG. 21 illustrates the timing when the first intermediate variable $x'_i$ is output from the time evolution unit 30 to an initial matrix multiplication unit 28. (B) in FIG. 21 illustrates the timing when the second intermediate variable $b_i$ is output from the last matrix multiplication unit 28 to the time evolution unit 30. (C) in FIG. 21 illustrates the timing of calculating the first intermediate variable $x'_i$ by the time evolution unit 30.

The first intermediate variable $x'_i$ is transferred with the degree of parallelism $P_c$. Therefore, as illustrated by (A) in FIG. 21, the transfer period of the first intermediate variables (x'b0 to x'b4095($t_1$)) at the first time point is $N_S(=N/P_c)$ clock cycles.

The second intermediate variable $b_i$ is transferred with the degree of parallelism $P_{r1}$. Therefore, as illustrated by (B) in FIG. 21, the transfer period of the second intermediate variables (bb0 to bb2047($t_1$)) at the first time point is $N/P_{r1}$ clock cycles.

In the time evolution unit 30, processing is executed with the degree of parallelism $P_{r1}$. Therefore, as illustrated by (C) in FIG. 21, the computation period of the second intermediate variables (bb0 to bb2047($t_2$)) at the second time point is $N/P_{r1}$ clock cycles.

Here, $L_a$ is a delay time from when output of the last first intermediate variable (x'b4095($t_2$)) at the first time point is completed to when output of the initial second intermediate variable (bb0($t_1$)) at the first time point is started. $L_b$ is a delay time from when output of the initial second intermediate variable (bb0($t_1$)) at the first time point is started to when the initial first intermediate variable (x'b0($t_2$)) at the second time point is calculated. $L_c$ is a delay time from when the initial first intermediate variable (x'b0($t_2$)) at the second time point is calculated to when the initial first intermediate variable (x'b0($t_2$)) at the second time point is output.

Here, a period from the start of a certain loop process to the start of the next loop process (one loop period) is $N_S+L_a+L_b\ L_c$. The calculation apparatus 10 can make ($L_b+L_c$) shorter than the transfer period ($N/P_{r1}$) of second intermediate variables (bb0 to bb2047($t_1$)) at the first time point. Therefore, in the calculation apparatus 10, output of the first intermediate variables (x'b0 to x'b4095($t_2$)) at the second time point is started before output of the second intermediate variables (bb0 to bb2047($t_1$)) at the first time point is completed. That is, the calculation apparatus 10 implements overlapping of loop processes. The calculation apparatus 10 can perform processing at high speed by implementing such overlapping.

When N is large, $N_S \gg L_a+L_b\ L_c$. Therefore, when N is large, $L_a+L_b$ L can be shortened to a negligible level with respect to the entire execution time. In this case, the matrix multiplication time in the calculation apparatus 10 can be considered as $N_S$ (=$N/P_c$) clock cycles.

For example, the matrix operation time of a matrix with a size N by a single-core processor is (N×N) clock cycles. The matrix multiplication time in the calculation apparatus 10 relative to the matrix multiplication time by a single-core processor is ($N/P_c$)/N×N. Therefore, the calculation apparatus 10 can perform matrix multiplication in a time $1/(P_c \times N)$, compared with a single-core processor.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A calculation apparatus configured to solve a combinatorial optimization problem, the apparatus comprising:
input circuitry configured to acquire, as the combinatorial optimization problem, a coefficient matrix including coefficients in N rows and N columns;
matrix multiplication circuitry including a plurality of series connected block matrix multiplication circuits each including a matrix memory and a buffer outputting to a successive block matrix multiplication circuit, configured to calculate N second intermediate variables at a first time point by performing matrix multiplication between N (N is an integer equal to or greater than two) first intermediate variables at the first time point and the coefficient matrix;
time evolution circuitry configured to calculate, based on the N second intermediate variables at the first time point, N first variables at a second time point and N first intermediate variables at the second time point, the second time point being a time point following one sampling period after the first time point;
management circuitry configured to increment a time point from a start time point to an end time point by adding a sampling period for each time point and to control the matrix multiplication circuitry and the time evolution circuitry such that at each time point, the matrix multiplication circuitry calculates N second intermediate variables at the time point, and the time evolution circuitry calculates N first variables and N first intermediate variables at a subsequent incremented time point; and
output circuitry configured to output, as a solution to the combinatorial optimization problem, N first variables at a preset end time.

2. The apparatus according to claim 1, wherein the time evolution circuitry further calculates N second variables at the second time point based on the N second intermediate variables at the first time point.

3. The apparatus according to claim 2, wherein the time evolution circuitry includes first addition circuitry configured to update N second variables at the first time point by adding the N second intermediate variables at the first time point to the N second variables at the first time point.

4. The apparatus according to claim 3, wherein
the time evolution circuitry further includes
first FX computing circuitry,
first FX addition circuitry,
first FY computing circuitry, and
first FY addition circuitry,
the first FX computing circuitry calculates N second derivative values by performing a first function operation on each of N first variables at the first time point,
the first FX addition circuitry calculates N second update values by adding the N second derivative values calculated by the first FX computing circuitry and the updated N second variables calculated by the first addition circuitry,
the first FY computing circuitry calculates N first derivative values by performing a second function operation on each of the N second update values calculated by the first FX addition circuitry, and
the first FY addition circuitry calculates N first update values by adding the N first derivative values calculated by the first FY computing circuitry and the N first variables at the first time point.

5. The apparatus according to claim 4, further comprising:
a first variable memory configured to store the N first update values calculated by the first FY addition circuitry as the N first variables at the second time point; and
a second variable memory configured to store the N second update values calculated by the first FX addition circuitry as the N second variables at the second time point.

6. The apparatus according to claim 4, wherein
the time evolution circuitry further includes
second to $M^{th}$ (M is an integer equal to or greater than two) (M−1) FX computing circuitry,
second to $M^{th}$(M−1) FX addition circuitry,
second to $M^{th}$ (M−1) FY computing circuitry, and
second to $M^{th}$ (M−1) FY addition circuitry,
an $m^{th}$ (m is an integer from two to M) FX computing circuitry calculates N second derivative values by performing the first function operation for each of N first update values calculated by a $(m-1)^{th}$ FY addition circuitry,
an $m^{th}$ FX addition circuitry calculates new N second update values by adding the N second derivative values calculated by the $m^{th}$ FX computing circuitry and N second update values calculated by a $(m-1)^{th}$ FX addition circuitry,
an $m^{th}$ FY computing circuitry calculates N first derivative values by performing the second function operation for each of the N second update values calculated by the $m^{th}$ FX addition circuitry, and
an $m^{th}$ FY addition circuitry calculates new N first update values by adding the N first derivative values calculated by the $m^{th}$ FY computing circuitry and N first update values calculated by the $(m-1)^{th}$ FY addition circuitry.

7. The apparatus according to claim 6, further comprising:
a first variable memory configured to store the N first update values calculated by the $M^{th}$ FY addition circuitry as the N first variables at the second time point; and
a second variable memory configured to store the N second update values calculated by the $M^{th}$ FX addition circuitry as the N second variables at the second time point.

8. The apparatus according to claim 4, wherein
the first function operation is expressed by $$dt'\times[\{-D+p-Kx_i^2\}x_i-c\times h_i\times a], \text{ and}$$

the second function operation is expressed by $$dt'\times D\times y_i,$$

where
$x_i$ is an $i^{th}$ first variable of the N first variables at the first time point or an $i^{th}$ first update value of the N first update values,
$y_i$ is an $i^{th}$ updated second variable of the updated N second variables calculated by the first addition circuitry or an $i^{th}$ second update value of the N second update values,
dt' is a preset short time,
D, c, and K are preset constants,
$h_i$ is a coefficient set for each i, and
p and a are values incremented for each time point according to a predetermined operation expression.

9. The apparatus according to claim 4, wherein the first function operation is expressed by $$dt' \times \{[(-D+p)(1+x_i^n)-Kx_i^{n+2}]x_i - c \times h_i \times a\}, \text{ and}$$

the second function operation is expressed by $$dt' \times D \times y_i,$$

where $x_i$ is an $i^{th}$ first variable of the N first variables at the first time point or an $i^{th}$ first update value of the N first update values, $y_i$ is an $i^{th}$ updated second variable of the updated N second variables calculated by the first addition circuitry or an $i^{th}$ second update value of the N second update values, dt' is a preset short time, D, c, and K are preset coefficients, $h_i$ is a coefficient set for each i, and p and a are values incremented for each time point according to a predetermined operation expression.

10. The apparatus according to claim 3, wherein the time evolution circuitry further includes
first FY computing circuitry,
first FY addition circuitry,
first FX computing circuitry, and
first FX addition circuitry,
the first FY computing circuitry calculates N first derivative values by performing a second function operation for each of the updated N second variables calculated by the first addition circuitry,
the first FY addition circuitry calculates N first update values by adding the N first derivative values calculated by the first FY computing circuitry and N first variables at the first time point,
the first FX computing circuitry calculates N second derivative values by performing a first function operation for each of the N first update values calculated by the first FY addition circuitry, and
the first FX addition circuitry calculates N second update values by adding the N second derivative values calculated by the first FX computing circuitry and the updated N second variables calculated by the first addition circuitry.

11. The apparatus according to claim 10, wherein the time evolution circuitry further includes
second to $M^{th}$ (M is an integer equal to or greater than two) (M−1) FY computing circuitry,
second to $M^{th}$ (M−1) FY addition circuitry,
second to $M^{th}$ (M−1) FX computing circuitry, and
second to $M^{th}$ (M−1) FX addition circuitry,
an $m^{th}$ (m is an integer from two to M) FY computing circuitry calculates N first derivative values by performing the second function operation for each of the N second update values calculated by a (m−1)$^{th}$ FX addition circuitry,
an $m^{th}$ FY addition circuitry calculates new N first update values by adding the N first derivative values calculated by the $m^{th}$ FY computing circuitry and N first update values calculated by a (m−1)$^{th}$ FY addition circuitry,
an $m^{th}$ FX computing circuitry calculates N second derivative values by performing the first function operation for each of the N first update values calculated by the $m^{th}$ FY addition circuitry, and
an $m^{th}$ FX addition circuitry calculates new N second update values by adding the N second derivative values calculated by the $m^{th}$ FX computing circuitry and N second update values calculated by the (m−1)$^{th}$ FX addition circuitry.

12. The apparatus according to claim 3, wherein the time evolution circuitry further includes
first multiplication circuitry configured to calculate the N first intermediate variables at the second time point by multiplying each of the N first variables at the second time point by a preset value, and
a first intermediate variable memory configured to store the N first intermediate variables at the second time point calculated by the first multiplication circuitry.

13. The apparatus according to claim 3, wherein the time evolution circuitry further includes
a first intermediate variable memory configured to store the N first variables at the second time point as the N first intermediate variables at the second time point, and
first multiplication circuitry configured to multiply each of the N second intermediate variables at the first time point output from the matrix multiplication circuitry by a preset value, and
the first addition circuitry updates the N second variables at the first time point by adding the N second intermediate variables at the first time point multiplied by a preset value by the first multiplication circuitry to the N second variables at the first time point.

14. The apparatus according to claim 1, further comprising input circuitry configured to provide N first intermediate variables at the start time point to the matrix multiplication circuitry.

15. The apparatus according to claim 1, wherein
for each of the plurality of block matrix multiplication circuits, a block matrix is set that includes coefficients in one or more rows of the N rows and all columns of the N columns of the coefficient matrix, the one or more rows differing among the plurality of circuits, and
each of the plurality of block matrix multiplication circuits calculates a part of the N second intermediate variables at the first time point by performing matrix multiplication between the N first intermediate variables at the first time point and the set block matrix.

16. The apparatus according to claim 15, wherein the time evolution circuitry
calculates N second variables at the second time point based on the N second intermediate variables at the first time point, and
calculates the N first variables at the second time point based on the N second variables at the second time point.

17. The apparatus according to claim 15, wherein each of the plurality of block matrix multiplication circuits includes
receiving circuitry configured to receive the N first intermediate variables at the first time point successively by a predetermined number, and
said buffer including transmitting circuitry configured to transmit the received N first intermediate variables at the first time point successively by the predetermined number, and
the receiving circuitry of a first circuit among the plurality of block matrix multiplication circuits receives at least a part of the N first intermediate variables at the first time point from the transmitting circuitry of a second block matrix multiplication circuit among the plurality of block matrix multiplication circuits.

18. The apparatus according to claim 17, wherein
each of the plurality of block matrix multiplication circuits starts the matrix multiplication before reception of all the N first intermediate variables at the first time point is completed.

19. The apparatus according to claim 1, wherein
the coefficient matrix is divided into $P_{r3}$ block matrices each including coefficients in $(N/P_{r3})$ rows ($P_{r3}$ is a divisor of N) and N columns,
the N second intermediate variables are divided into $P_{r3}$ blocks, each including $(N/P_{r3})$ second intermediate variables,
the $P_{r3}$ blocks are associated with the $P_{r3}$ block matrices in one-to-one correspondence,
the block matrix multiplication circuits include $P_{r3}$ block matrix multiplication circuitry associated with the $P_{r3}$ block matrices in one-to-one correspondence, and
each of the $P_{r3}$ block matrix multiplication circuits calculates $(N/P_{r3})$ second intermediate variables included in a corresponding block by performing matrix multiplication between the first intermediate variable and a corresponding block matrix.

20. The apparatus according to claim 19, wherein the $P_{r3}$ block matrix multiplication circuitry and the time evolution circuitry are included in $(P_{r3}+1)$ chips, each being individually independent.

21. The apparatus according to claim 19, wherein
each of the $P_{r3}$ block matrices is divided into $P_{r2}$ submatrices each including coefficients in $P_{r1}$ rows and N rows, where $P_{r1}$ and $P_{r2}$ are divisors of N, and $P_{r1} \times P_{r2} \times P_{r3} = N$,
each of the $P_{r3}$ blocks is divided into $P_{r2}$ sub-blocks, each including $P_{r1}$ second intermediate variables,
the $P_{r2}$ sub-blocks included in a $k^{th}$ (k is an integer equal to or greater than one and equal to or smaller than $P_{r3}$) block are associated with $P_{r2}$ submatrices included in a $k^{th}$ block matrix in one-to-one correspondence,
each of the $P_{r3}$ block matrix multiplication circuits further includes $P_{r2}$ submatrix multiplication circuitry associated with the $P_{r2}$ submatrices included in a corresponding block matrix in one-to-one correspondence, and
each of the $P_{r2}$ submatrix multiplication circuitry included in $k^{th}$ block matrix multiplication circuits performs matrix multiplication between the N first intermediate variables and a corresponding submatrix to calculate $P_{r1}$ second intermediate variables included in a corresponding sub-block.

22. The apparatus according to claim 21, wherein
each of the $P_{r3}$ block matrix multiplication circuits includes $P_{r2}$ stages of registers functioning as a shift register,
the $P_{r2}$ stages of registers are associated with the $P_{r2}$ submatrix multiplication circuitry in one-to-one correspondence, and
each of the $P_{r2}$ stages of registers stores $P_c$ ($P_c$ is a divisor of N) first intermediate variables in parallel in one clock cycle and transfers the stored $P_c$ first intermediate variables to a register on a next stage in parallel in a next clock cycle.

23. The apparatus according to claim 22, wherein each of the Pr2 submatrix multiplication circuitry outputs the Pr1 second intermediate variables included in a corresponding sub-block in parallel in one clock cycle and outputs the Pr1 second intermediate variables in a clock cycle different from other submatrix multiplication circuitry.

24. A calculation method using a calculation apparatus configured to solve a combinatorial optimization problem, the method comprising:
acquiring, as the combinatorial optimization problem, a coefficient matrix including coefficients in N rows and N columns;
calculating by matrix multiplication circuitry of the calculation apparatus N second intermediate variables at a first time point by performing matrix multiplication between N (N is an integer equal to or greater than two) first intermediate variables at the first time point and the coefficient matrix, the matrix multiplication circuitry including a plurality of series connected block matrix multiplication circuits each including a matrix memory and a buffer outputting to a successive block matrix multiplication circuit;
calculating by the calculation apparatus circuitry, based on the N second intermediate variables at the first time point, N first variables at a second time point and N first intermediate variables at the second time point, the second time point being a time point following one sampling period after the first time point;
incrementing by the calculation apparatus a time point from a start time point to an end time point by adding a sampling period for each time point and controlling the calculation apparatus such that at each time point, the calculation apparatus calculates N second intermediate variables at the time point and calculates N first variables and N first intermediate variables at a subsequent incremented time point; and
outputting, by the calculation apparatus and as a solution to the combinatorial optimization problem, N first variables at a preset end time point.

25. The method according to claim 24, wherein
the calculating the N intermediate variables at the first time point includes performing a plurality computing processes in parallel,
for each of the plurality of computing processes, a block matrix is set that includes coefficients in one or more rows of the N rows and all columns of the N columns of the coefficient matrix, the one or more rows differing among the plurality of computing processes, and
each of the plurality of computing processes includes calculating a part of the N second intermediate variables at the first time point by performing matrix multiplication between the N first intermediate variables at the first time point and the set block matrix.

26. A computer program product including a non-transitory computer readable storage medium including a program, wherein when the program is executed by an information processing apparatus that controls calculation processing performed by a calculation apparatus, including matrix multiplication circuitry comprising a plurality of series connected block matrix multiplication circuits each including a matrix memory and a buffer outputting to a successive block matrix multiplication circuit, configured to solve a combinatorial optimization problem, the program causes the calculation apparatus to perform:
acquiring, as the combinatorial optimization problem, a coefficient matrix including coefficients in N rows and N columns;
calculating, by the matrix multiplication circuitry, N second intermediate variables at a first time point by performing matrix multiplication between N (N is an integer equal to or greater than two) first intermediate variables at the first time point and the coefficient matrix;

calculating, based on the N second intermediate variables at the first time point, N first variables at a second time point and N first intermediate variables at the second time point, the second time point being a time point following one sampling period after the first time point;

incrementing a time point from a start time point to an end time point by adding a sampling period for each time point and controlling the calculation apparatus such that at each time point, the calculation apparatus calculates N second intermediate variables at the time point and calculates N first variables and N first intermediate variables at a subsequent incremented time point; and outputting, by the calculation apparatus and as a solution to the combinatorial optimization problem, N first variables at a preset end time point.

27. The computer program product according to claim 26, wherein the calculating the N intermediate variables at the first time point includes performing a plurality computing processes in parallel, for each of the plurality of computing processes, a block matrix is set that includes coefficients in one or more rows of the N rows and all columns of the N columns of the coefficient matrix, the one or more rows differing among the plurality of computing processes, and each of the plurality of computing processes includes calculating a part of the N second intermediate variables at the first time point by performing matrix multiplication between the N first intermediate variables at the first time point and the set block matrix.

28. A computer program product having a non-transitory computer readable medium including circuit information representing a configuration of a circuit configured to solve a combinatorial optimization problem, described by a hardware description language, wherein the circuit information causes the circuit to function as:

a calculation apparatus configured to solve a combinatorial optimization problem, the calculation apparatus comprising:

input circuitry configured to acquire, as the combinatorial optimization problem, a coefficient matrix including coefficients in N rows and N columns;

matrix multiplication circuitry, including a plurality of series connected block matrix multiplication circuits each including a matrix memory and a buffer outputting to a successive block matrix multiplication circuit, configured to calculate N second intermediate variables at a first time point by performing matrix multiplication between N (N is an integer equal to or greater than two) first intermediate variables at the first time point and the coefficient matrix;

time evolution circuitry configured to calculate, based on the N second intermediate variables at the first time point, N first variables at a second time point and N first intermediate variables at the second time point, the second time point being a time point following one sampling period after the first time point;

matrix multiplication circuitry, including a plurality of series connected block matrix multiplication circuits each including a matrix memory and a buffer outputting to a successive block matrix multiplication circuit, configured to increment a time point from a start time point to an end time point by adding a sampling period for each time point and to control the matrix multiplication circuitry and the time evolution circuitry such that at each time point, the matrix multiplication circuitry calculates N second intermediate variables at the time point, and the time evolution circuitry calculates N first variables and N first intermediate variables at a subsequent incremented time point; and output circuitry configured to output, as a solution to the combinatorial optimization problem, N first variables at a preset end time.

29. A server comprising:

the computer program product according to claim 28.

30. A computer program product having a non-transitory computer readable medium including circuit information written into a reconfigurable semiconductor device to operate the reconfigurable semiconductor device, wherein the circuit information causes the reconfigurable semiconductor device to function as:

a calculation apparatus configured to solve a combinatorial optimization problem, the calculation apparatus comprising:

input circuitry configured to acquire, as the combinatorial optimization problem, a coefficient matrix including coefficients in N rows and N columns;

matrix multiplication circuitry, including a plurality of series connected block matrix multiplication circuits each including a matrix memory and a buffer outputting to a successive block matrix multiplication circuit, configured to calculate N second intermediate variables at a first time point by performing matrix multiplication between N (N is an integer equal to or greater than two) first intermediate variables at the first time point and the coefficient matrix;

time evolution circuitry configured to calculate, based on the N second intermediate variables at the first time point, N first variables at a second time point and N first intermediate variables at the second time point, the second time point being a time point following one sampling period after the first time point;

management circuitry configured to increment a time point from a start time point to an end time point by adding a sampling period for each time point and to control the matrix multiplication circuitry and the time evolution circuitry such that at each time point, the matrix multiplication circuitry calculates N second intermediate variables at the time point, and the time evolution circuitry calculates N first variables and N first intermediate variables at a subsequent incremented time point; and output circuitry configured to output, as a solution to the combinatorial optimization problem, N first variables at a preset end time.

31. A server comprising:

the computer program product according to claim 30.

* * * * *